US007051080B1

(12) United States Patent
Paul et al.

(10) Patent No.: US 7,051,080 B1
(45) Date of Patent: May 23, 2006

(54) TECHNIQUES FOR NAVIGATING IN MOBILE APPLICATIONS

(75) Inventors: Jyotirmoy Paul, Redwood Shores, CA (US); Jeff Barton, South San Francisco, CA (US); Anit Chakraborty, Redwood City, CA (US); Siva Dirisala, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 778 days.

(21) Appl. No.: 09/872,986

(22) Filed: May 31, 2001

Related U.S. Application Data

(63) Continuation-in-part of application No. 09/631,884, filed on Aug. 4, 2000.

(60) Provisional application No. 60/222,817, filed on Aug. 4, 2000.

(51) Int. Cl.
G06F 15/16 (2006.01)
G06F 17/00 (2006.01)

(52) U.S. Cl. ............... 709/217; 709/227; 715/701; 715/702

(58) Field of Classification Search ........... 709/203, 709/217, 227, 219; 455/406, 405, 411; 345/765, 345/866, 157
See application file for complete search history.

(56) References Cited

U.S. PATENT DOCUMENTS

| | | | |
|---|---|---|---|
| 5,708,780 A | | 1/1998 | Levergood et al. |
| 5,764,916 A | | 6/1998 | Busey et al. |
| 5,790,800 A | | 8/1998 | Gauvin et al. |
| 5,835,712 A | * | 11/1998 | DuFresne .............. 709/203 |
| 5,835,914 A | | 11/1998 | Brim |
| 5,905,486 A | * | 5/1999 | Brittenham et al. ...... 345/157 |
| 5,918,013 A | | 6/1999 | Mighdoll et al. |
| 6,012,098 A | | 1/2000 | Bayeh et al. |
| 6,023,714 A | | 2/2000 | Hill et al. |
| 6,125,391 A | | 9/2000 | Meltzer et al. |
| 6,154,738 A | | 11/2000 | Call |
| 6,167,441 A | | 12/2000 | Himmel |

(Continued)

OTHER PUBLICATIONS

Siyan, Karanjit; NetWare TCP/IP and NFS; Copyright 1994 by New Riders Publishing; pp. 11, 94, 103.

*Primary Examiner*—John Follansbee
*Assistant Examiner*—Kenny Lin
(74) *Attorney, Agent, or Firm*—Hickman Palermo Truong & Becker, LLP

(57) ABSTRACT

Techniques for interacting with a client process on a mobile device connected to a network over a wireless link to navigate an application includes managing information at a mobile application server executing on a platform connected to the network. The information includes first data describing a graphical element for display on the mobile device. The first data also includes a first reference to the graphical element and a second reference to a page associated with requesting a service from a first application. Second data, based on the first data, is sent to the client process for rendering the graphical element on the mobile device. The second data includes the first reference. Third data is received indicating the first reference in response to a user of the mobile device selecting the graphical element. In response to receiving the third data, the page from the first application is requested based on the second reference. This page by page navigation leaves more room in the limited memory of the mobile device to present the user with more options than is often possible using either cookies or URLs with parameter information, as in the conventional approaches.

84 Claims, 15 Drawing Sheets

U.S. PATENT DOCUMENTS

| | | |
|---|---|---|
| 6,212,640 B1 | 4/2001 | Abdelnur et al. |
| 6,226,675 B1 | 5/2001 | Meltzer et al. |
| 6,233,608 B1 | 5/2001 | Laursen et al. |
| 6,247,048 B1 | 6/2001 | Greer et al. |
| 6,269,373 B1 | 7/2001 | Apte et al. .................. 707/10 |
| 6,279,121 B1 | 8/2001 | Gamo |
| 6,292,657 B1 * | 9/2001 | Laursen et al. ............. 455/411 |
| 6,300,947 B1 * | 10/2001 | Kanevsky .................. 345/866 |
| 6,301,471 B1 * | 10/2001 | Dahm et al. ................ 455/405 |
| 6,336,124 B1 | 1/2002 | Alam et al. |
| 6,345,279 B1 | 2/2002 | Li et al. |
| 6,353,850 B1 | 3/2002 | Wies et al. |
| 6,412,009 B1 | 6/2002 | Erickson et al. |
| 6,421,733 B1 | 7/2002 | Tso et al. |
| 6,430,624 B1 | 8/2002 | Jamtgaard et al. |
| 6,463,440 B1 | 10/2002 | Hind et al. |
| 6,463,565 B1 | 10/2002 | Kelly et al. .................. 716/1 |
| 6,473,609 B1 * | 10/2002 | Schwartz et al. ........... 455/406 |
| 6,477,565 B1 * | 11/2002 | Daswani et al. ............ 709/217 |
| 6,480,860 B1 | 11/2002 | Monday |
| 6,507,867 B1 | 1/2003 | Holland et al. |
| 6,510,434 B1 | 1/2003 | Anderson et al. |
| 6,519,617 B1 | 2/2003 | Wanderski et al. |
| 6,523,062 B1 | 2/2003 | Bridgman et al. |
| 6,526,439 B1 * | 2/2003 | Rossmann et al. .......... 709/219 |
| 6,535,896 B1 | 3/2003 | Britton et al. |
| 6,546,406 B1 | 4/2003 | DeRose et al. |
| 6,560,633 B1 | 5/2003 | Roberts et al. |
| 6,589,291 B1 | 7/2003 | Boag et al. |
| 6,593,944 B1 | 7/2003 | Nicolas et al. |
| 6,594,774 B1 | 7/2003 | Chapman et al. |
| 6,604,106 B1 | 8/2003 | Bodin et al. |
| 6,615,212 B1 | 9/2003 | Dutta et al. |
| 6,633,914 B1 | 10/2003 | Bayeh et al. |
| 6,635,089 B1 | 10/2003 | Burkett et al. |
| 6,658,625 B1 | 12/2003 | Allen |
| 6,681,245 B1 | 1/2004 | Sasagawa |
| 6,724,403 B1 * | 4/2004 | Santoro et al. ............. 345/765 |
| 6,741,853 B1 | 5/2004 | Jiang et al. |
| 6,754,660 B1 | 6/2004 | MacPhail |
| 6,788,667 B1 | 9/2004 | Beresin |
| 6,857,010 B1 | 2/2005 | Cuijpers et al. |
| 6,871,236 B1 | 3/2005 | Fishman et al. |

\* cited by examiner

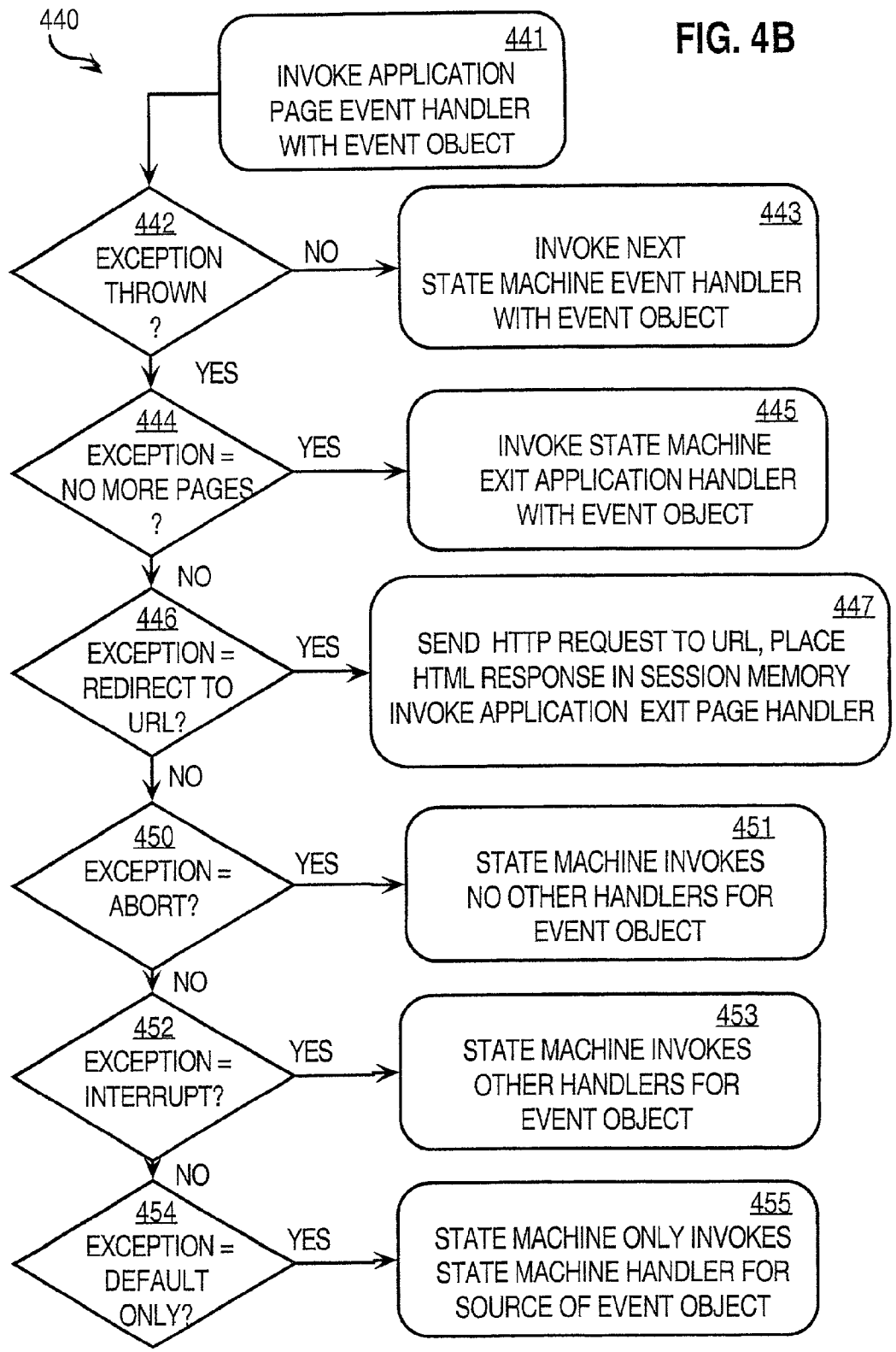

TECHNIQUES FOR NAVIGATING IN MOBILE APPLICATIONS

This application claims priority to U.S. provisional application Ser. No. 60/222,817, filed Aug. 4, 2000 entitled "Techniques for Implementing Mobile and Industrial Database Applications" by Jyotirmoy Paul, Jeff Barton, Anit Chakraborty and Siva Dirisala, hereby incorporated by reference in its entirety. This application also claims priority to and is a Continuation-In Part of U.S. application Ser. No. 09/631,884, filed Aug. 4, 2000 entitled "Multi-Device Support for Mobile Applications Using XML" by Jyotirmoy Paul, Jeff Barton, Anit Chakraborty and Siva Dirisala, hereby incorporated by reference in its entirety.

CROSS REFERENCE TO RELATED APPLICATIONS

This application is related to U.S. patent application Ser. No. 09/872,066, filed May 31, 2001 entitled "Maintaining State Information in Mobile Applications," by Jyotirmoy Paul, Jeff Barton, Anit Chakraborty and Siva Dirisala.

This application is related to U.S. patent application Ser. No. 09/872,566, filed May 31, 2001 entitled "Techniques for Supporting Multiple Devices in Mobile Applications," by Jyotirmoy Paul, Jeff Barton, Anit Chakraborty and Siva Dirisala.

This application is related to U.S. patent application Ser. No. 09/872,978, filed May 31, 2001 entitled "Techniques for Programming Event-Driven Transactions in Mobile Applications," by Jyotirmoy Paul, Jeff Barton, Anit Chakraborty and Siva Dirisala.

FIELD OF INVENTION

The present invention generally relates to network-based services for mobile, wireless devices. The invention relates more specifically to navigating among several pages associated with obtaining services from an application on a mobile, wireless device.

BACKGROUND OF THE INVENTION

Society is becoming increasingly reliant on network-based services. Network-based services are any services provided to devices over a network. Common network-based services include, for example, services provided over the World Wide Web, database services, etc.

Services provided over the World Wide Web are typically presented in the form of one or more web pages. A web page is data expressed in a HyperText Markup Language (HTML) and transferred over a network using the hypertext transfer protocol (HTTP) of the Internet protocol (IP). The network can be a local network, a wide area network, or the Internet itself, a public network of computer networks.

Database services may be provided by a database application, which in turn may access a database through services provided by a database server. A database application is a software application that communicates with a database server process on the network to store data into and retrieve data from a database.

According to the Internet protocol (IP), a program on one device connected to the network interacts with another program located on another device with asynchronous stateless messages. The two programs run independently and interact only through these messages. The messages are asynchronous in that each can take an arbitrary amount of time to travel from source device to destination device. Consequently, two successive messages may arrive out of order. The messages are stateless in that each message is sent, transmitted and received independently, without inheriting or relying on characteristics from any previous messages sent.

The program that initiates the communication is a client process, and the program that waits for and responds to a request from the client process is the server process. The term "client" is often used to refer to either the client process, or the machine on which the client process runs, or both. The term "server" is similarly used to refer to either the server process, or the machine on which the server process is executing, or both.

A widely used client process supported by many servers on the Internet is a browser. A browser communicates with servers to retrieve and decode data expressed in HTML. HTML marks portions of the data with tags related to the manner in which the portions are to be displayed.

Adding programs, referred to as plug-ins, to a browser can extend a browser's functionality. A browser that has added functionality due to one or more plug-ins is referred to herein as an extended browser. Extended browsers may, for example, use input forms into which the user can enter data that is validated in some regard before being sent back to the server. Standard HTML does not provide for this client side validation process.

Portable devices capable of wireless communications are finding ever more uses and popularity. Some of these mobile devices are able to connect to a network. It is desirable to make network-based services available for access by such network capable mobile devices.

When making network-based services available for mobile devices, one cannot count on the ability to use software designed for a general-purpose computer. The smallest laptops are too cumbersome for some uses, such as for wireless telephony and for warehouse inventory control. Handheld devices used by agents of an enterprise in the field for these uses have limited hardware and software due to constraints imposed by limited size and low power availability.

For example, screen size, memory and plug-in functionality on the handheld device may be significantly less than what is available through a browser on a laptop, so that a Web page easily viewed on a low-end laptop is essentially unintelligible on the mobile device. A network-based service cannot rely on a particular mobile device having a screen of a needed size or having the power to execute a full browser or to accept plug-ins, such as those that allow the browser to use forms.

Some of these small footprint handheld devices may not run a World Wide Web browser at all. For example, mobile telephones use a wireless application protocol (WAP), which does not respond to the full set of HTML tags. These devices use data presented in a wireless markup language (WML), a specific implementation of the extensible markup language (XML) using a WML-specific document type definition (DTD). Other handheld devices used in industry, such as bar code readers, communicate with a network using a teletype protocol (Telnet), which accepts or sends one character at a time, with little or no display options such as font size, font type, italics, and color, and without the capability for displaying images.

Complex interactions, such as those involving shopping online or employing an expert system to diagnose symptoms of a problem, require many messages to be sent back and forth between a client process and one or more server processes. In some cases, a first process must pass along "state information" with a first message to a second process, so that the second process will pass the state information back in a subsequent message to the first process. The state information received by the first process in the subsequent message lets the first process know that the subsequent message is related to the same transaction as the first message.

One technique to pass the state information involves including the state information along with the address that identifies the destination to which a message is sent. That address may take the form, for example, of a universal application locator (URL) address supplemented with extra characters that convey the state information.

Another technique involves placing the state information in a file called a cookie. The cookie is sent along with a message to a client machine. The client machine stores the cookie. Whenever the client machine sends a message to the source of the cookie, the client machine includes the cookie with the message.

Unfortunately, these approaches for communicating state information are not always available when the transaction involves a mobile device. For example, a mobile device running the WAP protocol has the capacity only for a limited amount of information in each page of information received. Specifically, in most mobile telephones, a page is limited by a maximum of about 1500 bytes (a byte is 8 binary digits and usually represents one character of text). In such a WAP device a long network address, such as a URL with a large amount of state information, is not feasible. Furthermore, the WAP Specification does not support cookies. Hence a Web server cannot manage a session with a WAP device involving a complex transaction that uses cookies.

Because there is a wide variety of mobile devices, with a wide range of screen sizes, colors, memory sizes, page buffers, processor types and client protocols, among other properties, it is generally cost prohibitive to try to duplicate all the functionality of a network-based service for each possible mobile device.

Based on the foregoing, there is a clear need for techniques that allow network-based services to be made readily available to a wide range of mobile devices or to support complex transactions involving several pages of graphical user interfaces, or both, without having to explicitly program each network-based service to support all forms of mobile devices.

SUMMARY OF THE INVENTION

According to one aspect of the invention, techniques are provided for interacting with a client process on a mobile device connected to a network over a wireless link to navigate from a graphical element of a user interface to a page associated with requesting a service from an application. The techniques include managing information at a mobile application server executing on a platform connected to the network. The information includes first data describing a graphical element for display on the mobile device. The first data also includes a first reference to the graphical element and a second reference to a page associated with requesting a service from a first application. Second data, based on the first data, is sent to the client process for rendering the graphical element on the mobile device. The second data includes the first reference. Third data is received indicating the first reference in response to a user of the mobile device selecting the graphical element. In response to receiving the third data, the page from the first application is requested based on the second reference.

In another aspect of the invention, techniques for interacting with a client process on a mobile device connected to a network over a wireless link to navigate an application, includes managing information at a mobile application server executing on a platform connected to the network. The information includes first data describing a plurality of pages sent for display on the mobile device. Each page is associated with requesting a service from an application. The information also includes second data describing associations between special keys on the mobile device and page changes among the plurality of pages. Third data is received from the client process indicating a user of the mobile device has pressed a particular key of the special keys. In response to receiving the third data, a particular page change associated with the particular key is determined. The particular page change is requested from the application.

This page by page navigation leaves more room in the limited memory of the mobile device to present the user with more options than is often possible using either cookies or URLs with parameter information, as in the conventional approaches.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4B is a flow chart that illustrates exception handling methods of the mobile interactions server.

DETAILED DESCRIPTION OF THE PREFERRED EMBODIMENT

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Operational Context

Figure 1A:
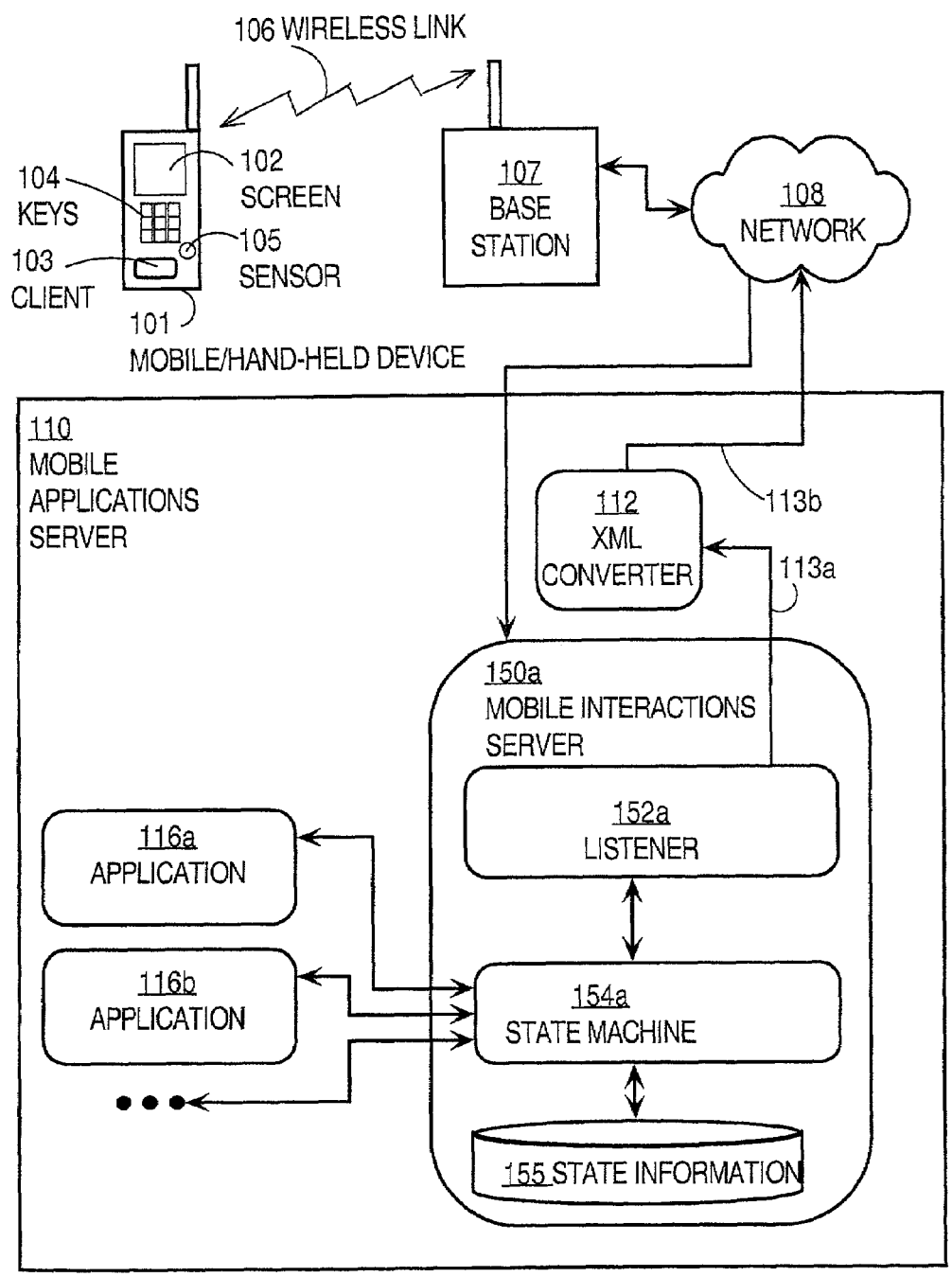
FIG. 1A is a block diagram that illustrates one embodiment of a mobile applications server connected to a network with which a mobile device communicates over a wireless link.

To illustrate network applications interacting with mobile devices employing a wireless link, consider FIG. 1A. FIG. 1A is a block diagram that illustrates one embodiment of a mobile applications server 110 connected to a network 108 with which a mobile device 101 communicates over a wireless link 106.

The mobile device 101 includes a screen display 102, one or more keys 104 and a client process 103 running on a microprocessor (not shown) in the mobile device 101. Some mobile devices may include a sensor 105, such as a microphone or barcode reader. The mobile device 101 communicates with a base station 107 using a wireless link 106 that may be proprietary. Examples of wireless links include a local radio frequency link such as IEEE 802.11, a wide area radio frequency link, a satellite link, and a personal communication services (PCS) data link through a WAP Gateway.

The base station 107 is connected to the network 108. The base station 107 passes network message traffic between the client 103 and the servers on the network 108. The network 108 may be any network using an asynchronous stateless protocol like TCP/IP, including a local network, a private wide area network, or the Internet.

The mobile applications server 110 includes one or more processes executing on a machine connected to the network 108. According to one embodiment, the mobile applications server 110 provides functionality for the mobile device 101 beyond the functionality built into the processor and client 103 on board the mobile device itself.

In one embodiment, the mobile applications server 110 provides one or more applications 116 that may be used by a mobile device over the network 108. For example, assume that mobile device 101 is a device having a barcode reader as the sensor 105. Such a device may be used in conjunction with an inventory application to update an inventory database. The update may be performed by scanning the barcode on an item and pressing a key to indicate whether the item is being added to the inventory, or is being removed from the inventory due to damage, due to sale, or due to transport to another warehouse.

For another example, a database application for mobile device 101 having a microphone, such as a mobile phone, could identify the user of the mobile device based on a comparison of the user's voice with a voice print for the user. The voice print may be maintained in a database by a database server on the same platform as the mobile applications server 110 or some other server platform on the network 108.

The mobile applications server 110 may also provide non-database applications. For example, if the sensor 105 is a global positioning system (GPS), then the mobile application could compute the area walked off by a user carrying the mobile device 101 based on positions output from the sensor 105 and transmitted to the mobile applications server 110.

According to several embodiments, applications 116 on mobile applications server 110 interact with mobile device 101 through a mobile interactions server 150 in the applications layer. The network device on which mobile applications server 110 executes also includes processes that execute in a network layer, a transport layer, and a security layer that are not significantly modified by the invention and are not described further.

Overview of Functional Components

Referring to FIG. 1A, mobile applications server 110 is one or more processes executing on a computing device connected to the network 108 that provides services for a mobile device 101 in response to one or more requests for services from the client process 103 executing on the mobile device 101.

Mobile applications server 110 includes one or more applications 116. In general, an application is a set of instructions that can be called to cause one or more processors to perform a series of related tasks for providing a requested service. An application often requires input data and produces output data. An application often comprises one or more methods that can be invoked separately each with their own input and output.

Many ways of producing applications are known in the art. For example, in one embodiment, the application is a package of JAVA classes containing public methods that can be invoked separately by the name of the method and the name of the class. Input for each public method is provided as one or more data structures called parameters and output is provided as a returned data structure. The names of the public methods, and the names and definitions of the input and returned data structures are published as an application programming interface (API). In another embodiment, the application is a library of methods created in another language that also has a published API. In still other embodiments, the application is a compiled program executed by a command line in the operating system language for the platform on which the applications reside. The compiled program operates on input in data files or on an input stream and produces output in data files or on an output stream, all defined in the operating system language. In yet other embodiments, the application is a script in the operating system language that executes several compiled programs in sequence.

Each application of the mobile applications 116 on the mobile applications server 110 provides functionality for mobile devices. As described in the background section, different mobile devices may have different characteristics. For example, different devices may communicate on the network through their base stations with different protocols (e.g., WAP, HTTP, Telnet), may have different keys and sensors, and may have different screen sizes, different memory capacities and different processing power. Such differences in characteristics complicate obtaining input for the application and presenting output from the application. These applications 116 are special in that they communicate with the mobile device 101 through a mobile interactions server 150, described next, in a manner that does not require developers of the application 116 to address specific characteristics of the individual mobile device 101.

The mobile applications server 110 includes the mobile interactions server 150 that provides data or methods or both for obtaining input data from the mobile device, for presenting output data at the mobile device, and for managing the data communicated with the mobile device. The mobile interactions server 150 receives requests from the client process 103 through the mobile device base station 107 and returns responses to the client process 103 through the base station 107. The mobile interactions server also passes data to the applications 116 involved, causes methods of the applications 116 involved to be executed, and receives any output from the applications 116 for the mobile device 101. The mobile interactions server thus operates to intercede between the application 116 and the mobile device 101 to insulate the application 116 from dealing with specific characteristics of individual mobile devices.

In the embodiment of FIG. 1A, the mobile interactions server 150 generates additional components at runtime in response to an initial request from the client process 103. These additional components include a listener 152, a state machine 154 and a state information database 155. The listener 152 is a process launched by the mobile interactions server 150. The listener monitors a port associated with input having a particular protocol (e.g., HTTP, WAP, or Telnet) on the mobile applications server. The listener acts in response to requests received from a client process on the port and causes data to be sent back to the client process over the network.

In the embodiment depicted, the listener produces descriptions in the eXtensible Markup Language (XML) of graphical elements for display on the screen 102 of mobile device 101 which are sent to a conventional XML converter 112 described below. When monitoring some ports, however, the listener 152 does not send an XML document. Instead, the listener 152 produces a response for the mobile device in the protocol used by the base station 107. For example, when listening on a Telnet port, the listener produces a response using the Telnet protocol. In this case, the response is sent to the base station via the network 108 and bypasses the conventional XML converter 112. If the response produced by the listener 152 for the client process uses the methods of an application 116 or information from previous requests and responses, then the listener causes a method of a state machine 154 to be executed and the listener bases the response for the client process on the data returned from the state machine 154.

The state machine 154 is a process that is launched by the listener. In some embodiments, the state machine 154 is a library of methods invoked as controlled by the listener 152. In other embodiments, the state machine 154 is a background process that executes in parallel waiting for a particular message upon which to act. The state machine 154 receives data from the listener 152 based on requests from the client process and returns responses to the listener 152 for the client process. The state machine 154 also determines which methods of which applications 116 are involved and causes the involved methods to be executed.

The state machine 154 also manages information about multiple requests and responses involving the client process for each client process communicating over the port. The state information database 155 is persistent storage for the information managed by the methods of the state machine 154 for the client process during the client communication session with the mobile interactions server. Thus, the state machine 154 and state information database 155 enable applications to perform complex transactions in which a response passed to the client in response to a request contains or depends on information carried in a previous request or response. In some embodiments the state information database survives for a limited time after communication with the client terminates—in case the break in communications is an unintentional interruption. If the client reestablishes communication within the limited time, then the state machine method invoked by the listener to commence a session with the client identifies the existing state information database for the client and employs the existing database instead of creating a new one.

The mobile applications server also includes a conventional XML converter process 112, which translates descriptions in the extensible Markup Language (XML) of graphical elements for display on the screen 102 of mobile device 101 to descriptions used by the base station 107 for several protocols. Conventional XML converters use an extensible Stylesheet Language (XSL) to translate from XML to any of several markup languages used by a variety of base stations. However, there is not a standard markup language for Telnet devices, and conventional XML converters do not translate XML descriptions into a markup language for Telnet. In an alternative embodiment, shown in FIG. 1D, the listener 152 produces Telnet protocol responses that are sent to the network 108, bypassing the conventional XML converter 112.

Figure 1B:
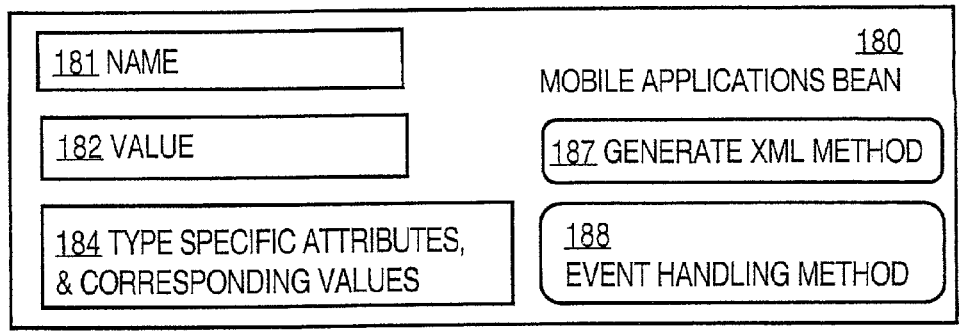
FIG. 1B is a block diagram that illustrates a graphical object used by an embodiment of the mobile applications server 110 to interact with a mobile device.
Figure 1C:
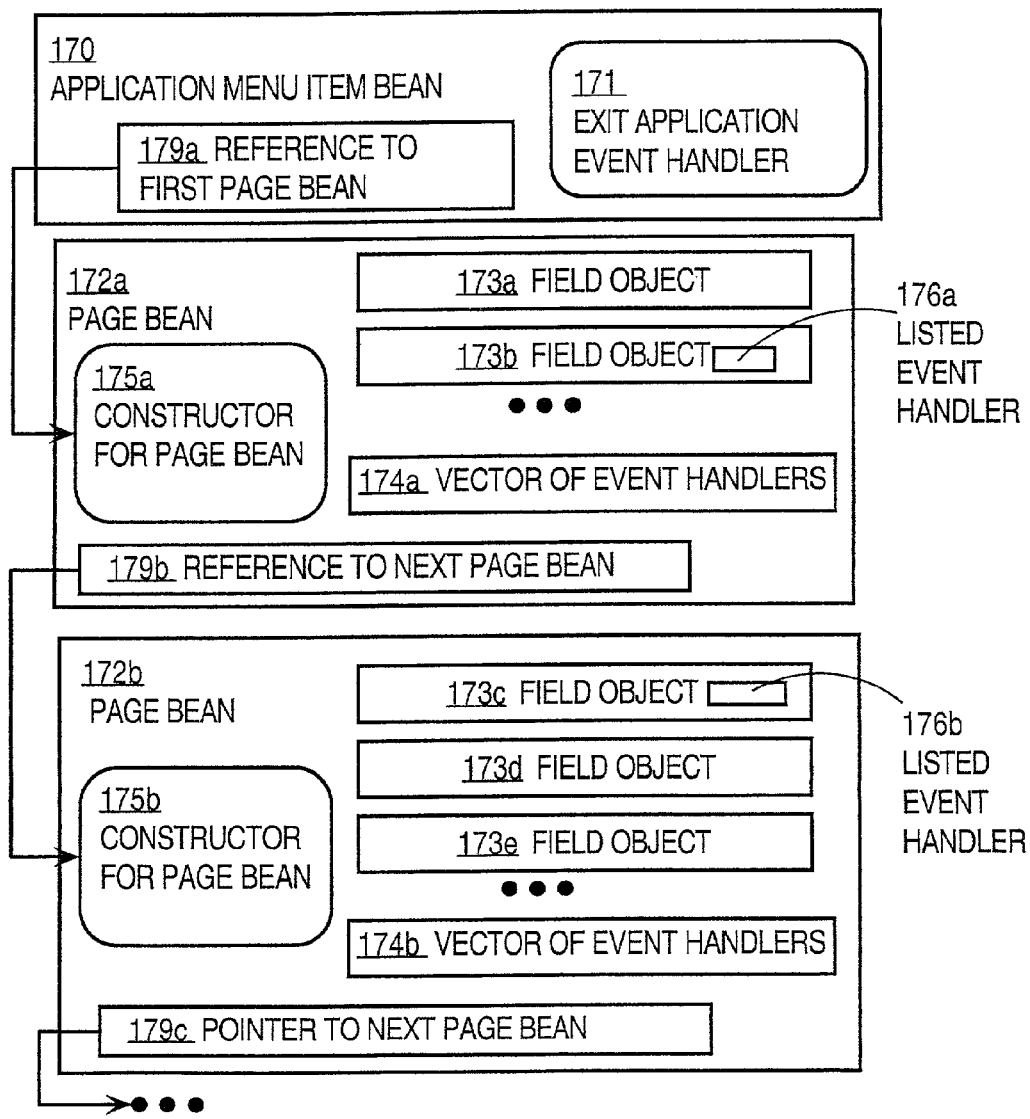
FIG. 1C is a block diagram that illustrates an embodiment of an application comprised of a hierarchy of graphical objects and methods.
Figure 1D:
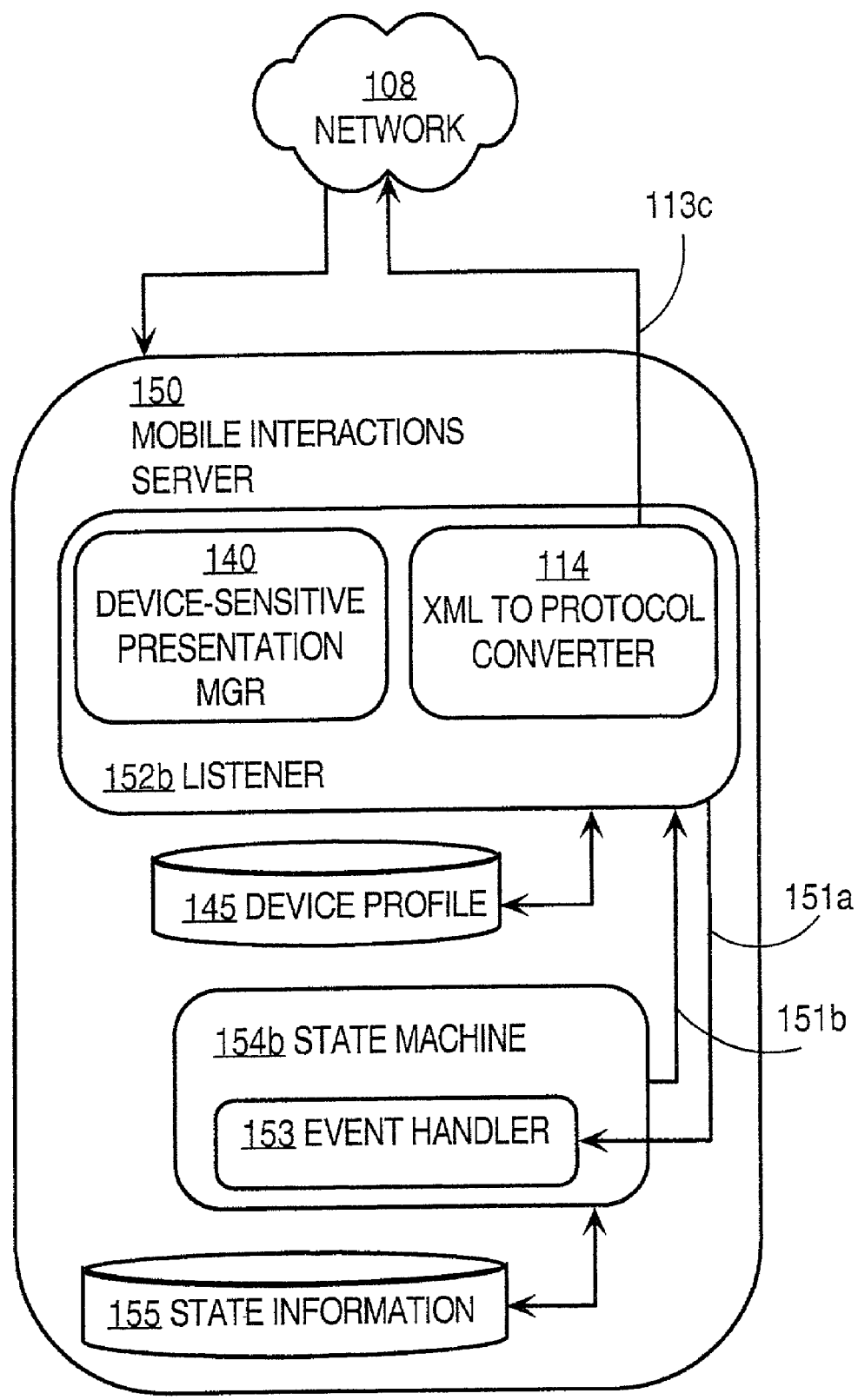
FIG. 1D is a block diagram that illustrates one embodiment of a mobile interactions server used in the mobile applications server of FIG. 1A.

FIG. 1D is a block diagram showing an embodiment 150*b* of mobile interactions server 150. This embodiment includes an embodiment 152*b* of listener 152 in which the listener 152 includes a device-sensitive presentation manager 140 and an XML to protocol converter 114. The device-sensitive presentation manager is a process that modifies the format of data received from the state machine for display on the screen 102 of the mobile device 101 based on information particular to the mobile device before sending the information to the client process.

For example, the data from the state machine indicates a menu of 10 items, but the screen 102 of the particular mobile device 101 has only five lines. The device-sensitive presentation manager 140 receives data indicating the menu with the ten items, determines that the mobile device has a display screen that only shows five lines, and reformats the data to send one of three subsets of the data, each subset indicating five lines of graphical display or less. For example, the first subset of data indicates four menu items for the first four lines and a button labeled "next items" for the fifth line. The second subset of data indicates three menu items for the middle three lines, a button labeled "prev items" for the first line and a button labeled "next items" for the fifth line. The third subset of data indicates a button labeled "prev items" on the first line followed by the last three menu items on the next three lines.

In the illustrated embodiment, the information particular to a mobile device comes from a device profile database 145 holding information about the characteristics of mobile devices. In other embodiments, the information comes from prompting the mobile device for its characteristics and obtaining an answer in a process called negotiating. In some embodiments the process is performed by invoking a method in a library of methods, in another embodiment the process executes in the background waiting for input from the listener.

In the illustrated embodiment, the output from the device sensitive presentation manager 140 is in XML, which is used as a common markup language relatively easily converted to device-specific protocols. In another embodiment, a different markup language is used as the common markup language.

Listener 152b also includes an internal XML to protocol converter 114. The internal converter 114 is a process that receives data in XML and converts it to a protocol used by the base station 107 of the mobile device 101. Some protocols use data in mark up languages produced by an external conventional XML converter 112. For these protocols, the internal XML to protocol converter 114 sends the XML data to the external conventional XML converter 112 with little or no change, as shown in FIG. 1A by arrow 113a. The external XML converter 112 uses XSL to produce different markup languages tailored to types of mobile device and sends data in these markup languages over the network as shown in FIG. 1A by arrow 113b. The external XML converter 112 produces various versions of HTML for HTTP clients like web browsers, a Handheld Device Markup Language (HDML) for some devices, a markup language for voice capable gateways (VoxML), and various versions of WML, such as for ERICSSON™ and NOKIA™ 7110 devices. An Example of a conventional XML converter suitable for the external converter 112 is PORTAL-TO-GO™ of the ORACLE™ Corporation.

For other protocols for which there is not a standard markup language, the internal XML to protocol converter 114 performs parsing of the XML data and converts the data to messages that follow the protocol. For example, for the Telnet protocol, the internal XML to protocol converter 114 determines which XML elements are displayed on the next line and sends the contents of those elements, character by character, to the base station 107, as dictated by the Telnet protocol. These Telnet responses are not sent to the external conventional XML converter 112 but are sent directly to the network as indicated by arrow 113c in FIG. 1D for the base station, bypassing the external conventional XML converter 112. This internal XML to protocol converter 114 is especially useful with industrial devices, for example, with industrial bar code readers used on the floor of a warehouse or factory, which communicate with an inventory database application over a local area network using the Telnet protocol.

Graphical Elements

According to the present invention, the applications 116 communicate indirectly with the mobile devices through the mobile interactions server 150 using data that describes one or more graphical elements that may be displayed on the screens of the mobile devices and may be associated with actions by a user of the mobile device, such as moving a cursor and pressing a key. Several types of known graphical elements are associated with known actions by a user who manipulates a cursor on the screen of the mobile device and coordinates the use of one or more keys on the mobile device. Among the known graphical elements are a text field, a button, a check list, a set of radio buttons, and a pull down menu (also called a popup menu). According to the disclosed techniques, the application employs these graphical elements and others to prompt for and obtain a series of inputs from a user of the mobile device in order to conduct a complex transaction. The techniques allow an application designer to include graphical elements without the application designer providing the details of how the graphical elements are communicated to the mobile device or how much information is stored on the mobile device.

For example, an application can be built to allow a mobile telephone user to search for a name in a telephone directory maintained in a telephone directory database by a third party and to download the name and number to the mobile telephone's speed dial list maintained in persistent memory on the mobile telephone. The application constructs a first set of graphical elements for the mobile telephone to prompt the user of the telephone to input each character of the name being searched for. This set of graphical elements used together is called a page. The application uses the name input by the user to construct a query to send to the third party database to obtain a list of names and numbers that match the name being searched for. The application then constructs another page of one or more graphical elements to present the one or more resulting names and prompt for the user to select one or more. In response to further user action, the application then constructs another page of graphical elements to prompt the user to indicate whether the selected names should be added to the speed dial directory or dialed or ignored. Based on the response the application issues a command that causes the telephone to add the numbers to the telephone's speed dial directory or to dial a selected one number or to simply end the application. According to the techniques described below, this application can employ all the graphical elements needed without dealing with the details of the protocol to communicate with the device, or how the graphical element is rendered on the screen of the mobile device, or maintaining all the user inputs in persistent storage.

The Structures for Graphical Elements

The fundamental building block for a graphical user interface for interacting with a user of the mobile device is the graphical element. A page is constructed of one or more graphical elements that are intended to be used together by a user of the mobile device. An application is built of one or more pages. When a user first requests services from the mobile applications server, the user is presented with a main menu including a menu item for each selectable application on the mobile applications server. When the user selects one of the menu items, the user is presented with the first page of the corresponding application.

The graphical element and the page and the menu item are implemented as objects in an object-oriented language like JAVA™. In object-oriented implementations, an object is a data structure that is a particular instance of a data structure type defined in a class. The objects are said to be instantiated from the class. The class defines the attributes and methods for all the objects in the class. While all objects instantiated from the same class have the same attributes, the values that those objects store for those attributes may vary from object to object. Furthermore, an attribute may be defined to refer to an object of a second class, so that the value this attribute takes is an object of the second class. Classes can inherit some or all of their attributes and methods from other classes which themselves may inherit attributes and methods from other classes. In JAVA, the classes form a hierarchy and a class can only inherit from classes above them in the hierarchy to avoid cyclic inheritance. In JAVA several classes are stored together in a package. Each class in the package has a unique name and the names together constitute a namespace.

According to the object oriented implementation, a menu item object corresponding to the application includes one or more page objects as attribute values, and each page object includes one or more field objects as attribute values. A field object corresponds to a graphical element.

Mobile Applications Bean Objects

A bean is a class of objects with at least a minimum set of attributes and methods, including a bean name and a method for listing the attributes (i.e., properties) and attribute values of each object. This method gives the bean class the behavior of introspection. In one embodiment the bean class methods includes a method for setting a value for an attribute of the object, and a method for getting the value of the attribute. These methods give the bean class the behavior of persistence, and, by providing a standard format for storing and retrieving information, give the bean class the behavior of serialization. In this embodiment, the methods provide the functionality to store and retrieve the attributes and attribute values of instances of the bean class or of instances of classes that inherit from the bean class.

In another embodiment, the bean class includes a vector of event handling methods. An event is an object generated by a listener in response to a message from a client process. Different listeners produce different event types. The event received from the listener is the input parameter for the event handler corresponding to the event type. The vector of event handlers in the bean class handle events in response to a user of the mobile device activating a control of the mobile device 101, such as by pressing a key 104 of the mobile device, using a pointing device on the mobile device, or turning on the sensor 105. In some embodiments, event handling methods are implementations of interfaces for handling event objects. An interface is data that defines the name for a method and the names of the parameters used as input to the method, and the class of the objects used as values for the parameters, and the class of the object returned, if any. The class is often identified by the name of the class; the name of the class of which an object is an instance is also called the type of the object. An implementation of an interface provides the instructions to use the parameters to produce the returned value.

A JavaBeans class is a commercially available, published bean class including methods for providing introspection, persistence and event handling.

According to the present disclosed techniques, mobile applications beans are provided to an application developer and used in the application. A mobile applications bean is a class that inherits the attributes, attribute values and methods of a bean class and extends them for describing a graphical element, a page or an application menu item. The mobile applications bean extends the bean class by providing an additional one or more attributes or by replacing one or more methods or by adding one or more methods or interfaces, or by some combination of these changes. A menu item bean is a mobile applications bean extended to provide the attributes and methods used when an application is invoked or launched and when the application terminates. A page bean is a mobile applications bean extended to provide the attributes and methods used when a page is entered and exited. A field type bean class is a mobile applications bean class extended for each graphical element. A different field type bean class is defined for each of the known graphical elements used to interact with a user of a mobile device. For example, a field type bean class is defined for a text field, a button, a radio button, a checklist, a list, and a list of selectable values, as described in more detail below.

FIG. 1B shows some of the main attributes and methods included in a mobile applications bean 180. A mobile applications bean 180 includes a bean name 181 and a bean value 182 as required by all beans. The mobile applications bean also includes zero or more attributes and attribute values 184 particular to the type of mobile applications bean. In this context the type of a mobile applications bean is used to indicate one of the menu item bean, the page bean, and the field type beans, such as the text bean, the button bean and other beans mentioned above or described in more detail below.

The mobile applications bean 180 includes a method 187 for generating an XML document that describes the graphical element to be displayed on a screen of the mobile device to represent an object of the mobile applications bean. An XML document that describes a graphical element for display on a variety of mobile devices is described in more detail in the related application incorporated by reference in its entirety above.

The mobile applications bean 180 includes a method 188 for handling an event generated by a listener when a graphical element corresponding to the bean is involved in an action by the user of the mobile device. For some mobile applications beans this method 188 is just an abstract method naming the method and the parameters and the parameter types and including a return statement to end the method, but not performing any significant functions. The event handling method is to be written by the application programmer when the application is built in order to have the event handling method perform the desired tasks of the application as described with an example below. The mobile applications beans include default event handlers for all events generated by the mobile interactions server. In addition, a set of event handlers, corresponding to a limited set of predefined events, is defined in a mobile applications interface so that the application developer can provide the instructions to execute upon occurrence of one of the predefined events. The predefined events are high-level, generic events that insulate the application from the device-specific details of user actions on the mobile device, such as keys stroked and pointing device characteristics manipulated.

For example, a predefined field-entered event is generated when a cursor on the screen 102 of the mobile device 101 enters a graphical element associated with a field type bean. A pre-defined special-key-pressed event is generated when a special key of the keys 104 is pressed to move to a different page without completing and submitting the current page. A pre-defined page-exited event is generated when a user indicates the user is finished with the page, such as when an enter key is pressed with the cursor placed on a button labeled "submit." If the application does not include instructions for the event handling methods for these events, the mobile interactions server employs one of the built-in event handlers for these events. More details on the event handling methods and interfaces are described in a later section.

The Field Bean

The field beans describe the attributes and behavior of the graphical elements displayed on the screen 102 of the mobile device 101 and used to display information to the user or collect data from the user or both.

According to one embodiment, a set of nine field types are defined by corresponding field type bean subclasses of a field bean subclass of the mobile applications bean. The set of nine field bean types are provided to the application developer to instantiate and add event handlers to provide the behavior for the application being developed. The nine field type beans include a text field bean, a list of values (LOV) field bean, a list field bean, a multi-list field bean, a checkbox field bean, a radio field bean, a button field bean, a heading field bean, and a separator field bean. The values assigned to properties of the field beans are used to customize the instantiated field type for particular applications. For example, the "hidden" property of a text bean may be set to "true" to suppress display of the value. Similarly, the "editable" property of a text bean may be set to "true" to allow the user to type characters that replace the characters currently in the value of the bean. Default values provided for some attributes are assigned if the application does not explicitly assign other values. In the preferred embodiment, a method 187 for generating an XML document for each field type bean is built-in and need not be written or replaced by the application developer.

Figure 5A:
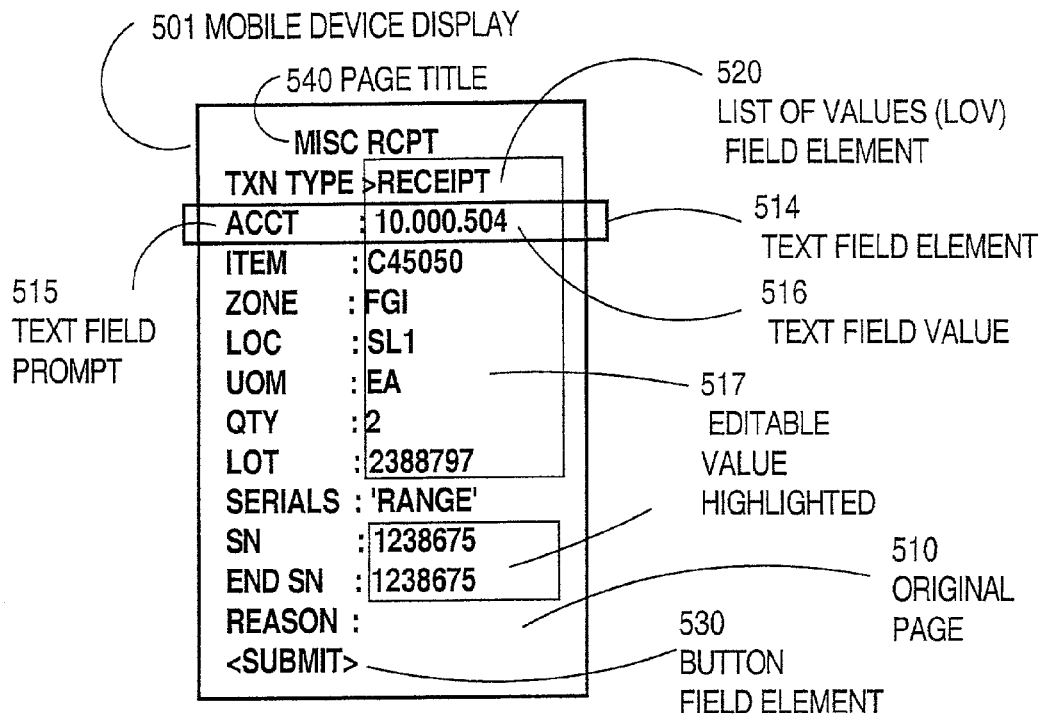
FIG. 5A is a diagram that illustrates an embodiment of a page on a display of a mobile device.

FIG. 5A shows how text field beans are rendered on a Telnet device having a fourteen line display. This display is based on the XML document produced by method 187 for this subclass and subsequently processed by the XML to protocol converter 114. A device using the Telnet protocol adds one character at a time to the current line of a display device, except that a special "line-feed" character displays a new line with no characters. Some Telnet devices display only the current line, others display several lines. On Telnet display 501, text field bean 514 is displayed as a string of characters including a text field prompt 515 and a text field value 516. A prompt is an attribute (i.e., property) of this text field subclass, which has a value of "ACCT" for the object displayed. The "ACCT" prompt value indicates the text field 514 contains a value for an account number.

The editable attribute of this text field element is indicated by the XML document produced by method 187 for this bean. The editable field is rendered as a reversed background highlight 517 according to the XML to protocol converter 114 based on information in the device profile database 145 about the display used by this device. For example, it is determined from the device profile database that the display on the particular mobile device in which the client process is executing supports reverse background text. Then the editable text is highlighted on this Telnet display by reversing black and white for the characters and background. The user of the mobile device may replace the characters in the value of this field bean with other characters indicating a different account number. As the user strokes each character key, the built-in event handling method 188 for the text field bean automatically uses the XML generating method 187 to produce an XML document that describes the new character in the field and the cursor moved to the next position. The application developer does not have to replace either method 187 or 188 and therefore does not need to know the details of communicating with the mobile device.

Sample attributes of the nine field bean classes are provided in Tables 1 through 9. Values are assigned to these attributes by the application to specify the layout of the graphical elements with which a user of the mobile device receives and enters data. The information in each of the following tables is also used in the method 187 to generate XML documents for the objects instantiated from the bean. The method 187 to generate XML uses an XML document type definition (DTD) for the bean. The DTD defines XML element tags that correspond to the field bean types and attributes that correspond to the entries in the "Attribute" column. The DTD also specifies data types for the attributes that correspond to the entries in the "Allowed Values" column and default values that correspond to the entries in the "Default Value" column in the Tables 1 through 9. A corresponding style sheet is used by the XML converters 112 and 114 to translate the XML document into other markup languages or protocols.

If an attribute is inherited from the field bean of the mobile applications bean, a "yes" appears in the "Inherited" column in Tables 1 through 9. A short description of the graphical effect of the attribute on a corresponding graphical element ultimately produced on the screen of a mobile device is included in the column titled "Graphical Effect." The "get", "set" and "is" columns refers to the bean class methods used to access the attribute; the "is" method is used to get an attribute value that holds a logical value "true" or "false".

A text field bean object is used to display text or receive text input from a user. Constraints on user input, if any, are described by some of the attributes for this bean. Table 1 shows attributes of the text field bean.

TABLE 1

Text field bean attributes

| Attribute | Inherited | Graphical Effect | Allowed Values | Default Value | get | set | is |
|---|---|---|---|---|---|---|---|
| Name | yes | none | any string | NULL | X | X | |
| Prompt | yes | displayed text to prompt user input | any string 9 characters in length or less | NULL | X | X | |
| Hidden | yes | do not display the field | "true" "false" | "false" | | X | X |
| Required | no | field cannot be exited until a character is input | "true" "false" | "false" | | X | X |
| AlterCase | no | forces the input characters to appear in upper or lower case | "U" for upper "L" for lower "N" for no forcing | "N" | X | X | |
| Value | no | displayed text in input area | consistent with ValueType attribute | NULL | X | X | |

TABLE 1-continued

Text field bean attributes

| Attribute | In-herited | Graphical Effect | Allowed Values | Default Value | get | set | is |
|---|---|---|---|---|---|---|---|
| ValueType | no | refuses input of the wrong type | "S" for string "N" for number "D" for date "R" for range | "S" | X | X | |
| NextPageName | no | controls navigation upon exiting field | string for unique name of next page | NULL | X | X | |
| Editable | yes | Value attribute changed by user input indicated by highlighting | "true" "false" | "true" | | X | X |
| Password | no | do not display Value attribute | "true" "false" | "false" | | X | X |
| Length | no | maximum number of characters allowed on input | any number | "10" | X | X | |

A list of values (LOV) field bean object is used to present the user with a pop-up list of selectable items and obtain user input signifying one of the selectable items, such as in a pop-up (or pull down) menu. The bean for these objects allows the list of selectable items to be determined dynamically at runtime by providing an attribute to store a command that launches a procedure to generate the list. The command is a structured query language (SQL) statement or a call to a packaged procedure in JAVA or PL/SQL, a proprietary extension of SQL supported by the ORACLE™ Corp. A result set produced in response to executing the procedure may include more than one subfield for each listed item, so the bean provides attributes to describe the subfields and their display. An example of how a LOV bean object is displayed on a Telnet device is provided later. Table 2 shows attributes of the LOV bean.

TABLE 2

List of values (LOV) field bean attributes

| Attribute | In-herited | Graphical Effect | Allowed Values | Default Value | get | set | is |
|---|---|---|---|---|---|---|---|
| Name | yes | none | any string | NULL | X | X | |
| Prompt | yes | displayed text to prompt user input | any string 9 characters in length or less | NULL | X | X | |
| Hidden | yes | do not display the LOV field | "true" "false" | "false" | | X | X |
| Required | no | field cannot be exited until a choice is input | "true" "false" | "false" | | X | X |
| AlterCase | no | forces the input characters to appear in upper or lower case | "U" for upper "L" for lower "N" for no forcing | "N" | X | X | |
| Value | no | displayed text in input area | consistent with ValueType attribute | NULL | X | X | |
| ValueType | no | refuses input of the wrong type | "S" for string "N" for number "D" for date "R" for range | "S" | X | X | |
| NextPageName | no | controls navigation upon exiting field | string for unique name of next page | NULL | X | X | |
| Editable | yes | Value attribute changed by user input indicated by highlighting | "true" "false" | "true" | | X | X |
| Length | no | maximum number of characters allowed on input | any number | "10" | X | X | |
| LOVstatement | no | command that causes a processor to generate list of values from which user will select | SQL query, or packaged procedure with one results set output | NULL | X | X | |

TABLE 2-continued

List of values (LOV) field bean attributes

| Attribute | In-herited | Graphical Effect | Allowed Values | Default Value | get | set | is |
|---|---|---|---|---|---|---|---|
| Input Parameters | no | none | array of strings with input parameters for procedure in LOVstatement | NULL | X | X | |
| InputParameter Types | no | none | array of strings with input parameter types "S" string in session memory "N" number in session memory "D" date in session memory "T" time in session memory "AS" string "AN" number "AD" date "AT" time | NULL | X | X | |
| SubfieldNames | no | none | array of strings with names of subfields on each listed item in results set | NULL | X | X | |
| Subfield Prompts | no | text displayed proximate to each subfield displayed | array of strings for each subfield | NULL | X | X | |
| Subfield Displays | no | display subfield | array of "true" "false" values | NULL | X | X | |
| SelectedValues | no | none | array of strings for all subfields in selected list item | NULL | X | X | |

The input for the procedure in the LOV statement attribute may be provided directly when the object is instantiated from the LOV bean. The LOV bean also allows the parameters input to the procedures to be obtained from the information managed by the state machine for the session, as indicated in Table 2 by the expression "session memory." In the illustrated embodiment session memory is the state information database 155. If the input parameter comes from session memory, the input parameter is provided not by a value but instead by the reference to the information in the session memory. In some embodiments the reference is a unique name for the information as described in more detail later. The InputParameterTypes attribute holds strings that indicate whether each input parameter is an actual string (AS), number (AN), date (AD) or time (AT), in which case the type begins with the letter "A", or whether each input parameter is a reference to a string (S), number (N), date (D) or time (T), in the session memory, in which case there is no "A" prefix.

A list field bean object is used to display lists of related items or receive text input from a user for some or all of the listed items or both. Constraints on user input, if any, are described by some of the attributes for this bean. Table 3 shows attributes of this field bean.

TABLE 3

List field bean attributes

| Attribute | In-herited | Graphical Effect | Allowed Values | Default Value | get | set | is |
|---|---|---|---|---|---|---|---|
| Name | yes | none | any string | NULL | X | X | |
| Value | yes | number of items in list if all displayed | any number | NULL | X | X | |
| Prompt | yes | displayed text to prompt user input | string of 9 characters in length or less | NULL | X | X | |
| Hidden | yes | do not display the field | "true" "false" | "false" | | X | X |
| Values | no | displayed text in input area | array of values consistent with ValueType attribute | NULL | X | X | |

TABLE 3-continued

List field bean attributes

| Attribute | In-herited | Graphical Effect | Allowed Values | Default Value | get | set | is |
|---|---|---|---|---|---|---|---|
| ValuesTypes | no | refuses input of the wrong type | array of types "S" for string "N" for number "D" for date "R" for range | NULL | X | X | |
| ValuesLabels | no | text displayed adjacent to listed item | array of strings of 9 characters or less | NULL | X | X | |
| NextPageName | no | controls navigation upon exiting field | string for unique name of next page | NULL | X | X | |
| Editable | yes | One item on list selected by user input indicated by highlighting | "true" "false" | "true" | | X | X |
| SelectedItem | no | determines which item is highlighted | number ≤Value | NULL | X | X | |

A multi-list field bean object is used to display multiple lists of related items or receive text input from a user for some or all of the listed items or both. Constraints on user input, if any, are described by some of the attributes for this bean. A multi-list bean is useful for receiving input into a table of rows and columns. Table 4 shows attributes of this field bean.

TABLE 4

Multi-list field bean attributes

| Attribute | In-herited | Graphical Effect | Allowed Values | Default Value | get | set | is |
|---|---|---|---|---|---|---|---|
| Name | yes | none | any string | NULL | X | X | |
| Value | yes | number of lists in object if all displayed | any number | NULL | X | X | |
| Prompt | yes | displayed text to prompt user input | string of 9 characters in length or less | NULL | X | X | |
| Hidden | yes | do not display the field | "true" "false" | "false" | | X | X |
| Numbers | no | number of items in each list | array of numbers | NULL | X | X | |
| Values | no | displayed text in input area of all items in all lists | array of values consistent with ValueType attribute | NULL | X | X | |
| ValueType | no | refuses input of the wrong type | array of types "S" for string "N" for number "D" for date "R" for range | NULL | X | X | |
| ValuesLabels | no | text displayed adjacent to listed item | array of strings of 9 characters or less | NULL | X | X | |
| NextPageName | no | controls navigation upon exiting field | string for unique name of next page | NULL | X | X | |
| Editable | no | Values attribute changed by user input indicated by highlighting | array of "true" "false" values | "true" | | X | X |
| Length | no | maximum number of characters allowed on input for each list | array of numbers | NULL | X | X | |

A checkbox field bean object is used to allow a user to select none, one, some or all of one or more options. The checkbox is especially useful when the options require many characters to specify. Table 5 shows attributes of the checkbox field bean.

TABLE 5

Checkbox field bean attributes

| Attribute | Inherited | Graphical Effect | Allowed Values | Default Value | get | set | is |
|---|---|---|---|---|---|---|---|
| Name | yes | none | any string | NULL | X | X | |
| Prompt | yes | displayed text to prompt user input | any string | NULL | X | X | |
| Hidden | yes | do not display the field | "true" "false" | "false" | | X | X |
| Required | no | field cannot be exited until a choice is input | "true" "false" | "false" | | X | X |
| Checked | no | check mark appears in box or equivalent | "true" "false" | "false" | | X | X |
| NextPageName | no | controls navigation upon exiting field | string for unique name of next page | NULL | X | X | |
| Editable | yes | Checked attribute changed by user input | "true" "false" | "true" | | X | X |

A radio button field bean object is used allow a user to select one or more of several related options. The radio button is especially useful when the options are mutually exclusive. Table 6 shows attributes of the radio button field bean.

TABLE 6

Radio button field bean attributes

| Attribute | Inherited | Graphical Effect | Allowed Values | Default Value | get | set | is |
|---|---|---|---|---|---|---|---|
| Name | yes | none | any string | NULL | X | X | |
| Prompt | yes | displayed text to prompt user input | any string | NULL | X | X | |
| Hidden | yes | do not display the field | "true" "false" | "false" | | X | X |
| GroupName | no | relates several radio buttons with same GroupName | any string | NULL | X | X | |
| GroupLabel | no | displays text proximate to several radio buttons | any string | NULL | X | X | |
| Required | no | field cannot be exited until a choice is input | "true" "false" | "false" | | X | X |
| Checked | no | solid dot appears in circle or equivalent | "true" "false" | "false" | | X | X |
| Exclusive | no | only one radio button in group may be checked | "true" "false" | "true" | | X | X |
| NextPageName | no | controls navigation upon exiting field | string for unique name of next page | NULL | X | X | |
| Editable | yes | Checked attribute changed by user input | "true" "false" | "true" | | X | X |

A button field bean object is used to present a button to a user of a mobile device and receive input indicating completion of input for the current page. For example, a "SUBMIT" or "DONE" or "OK" button is instantiated from the button field bean. Typically a task is performed by the application and then a new page is displayed to the user. Table 7 shows attributes of the button field bean.

TABLE 7

Button field bean attributes

| Attribute | In-herited | Graphical Effect | Allowed Values | Default Value | get | set | is |
|---|---|---|---|---|---|---|---|
| Name | yes | none | any string | NULL | X | X | |
| Prompt | yes | displayed text to prompt user input | any string 9 characters in length or less | NULL | X | X | |
| Hidden | yes | do not display the field | "true" "false" | "false" | | X | X |
| NextPageName | no | controls navigation upon exiting field | string for unique name of next page | NULL | X | X | |

The header field bean is used to insert text into the header or title area of a screen on a mobile device. Attributes of a header field bean are shown in Table 8.

TABLE 8

Attributes of a header text bean

| Attribute | In-herited | Graphical Effect | Allowed Values | Default Value | get | set | is |
|---|---|---|---|---|---|---|---|
| Name | yes | none | any string | NULL | X | X | |
| Value | yes | displayed text | any string | NULL | X | X | |

The separator bean is used by some of the other beans to provide a consistent use of characters that signal to a user of the mobile device the type of input expected after a prompt. For example, in one embodiment a colon (:) is used as a separator between a prompt and a text value in a text field bean and a greater-than sign (>) is used as a separator between a prompt and a value selected from a list of values in a list of values bean. Attributes of a separator bean are shown in Table 9.

TABLE 9

Attributes of a separator bean

| Attribute | In-herited | Graphical Effect | Allowed Values | Default Value | get | set | is |
|---|---|---|---|---|---|---|---|
| Name | yes | none | any string | NULL | X | X | |
| Value | yes | displayed separator character | single character | NULL | X | X | |
| Type | no | type of field bean in which separator is used | "text" "LOV" "list" "multilist" "checkbox" "radio" "button" "heading" | NULL | X | X | |

The Page Bean

A page object is intended to represent a group of graphical elements that are used together. A page object includes instances of one or more field beans listed in the page bean's attribute named field beans vector. The page bean extends the bean class to include a constructor method that instantiates the page and a method to add field beans to the field beans vector attribute. The page bean also extends the bean class to include page event handling methods. Logic can be included in the page bean's event handling methods to add field beans at runtime so that the pages can respond dynamically, for example in response to the information managed by the state machine.

The page bean class also includes a multiple-instance attribute, which determines whether a user can navigate to a particular page object more than once. For example, the user may press a "submit" button that returns the user to a page named "Shopping Cart". This can either be treated as a return to a Shopping Cart page with values for the attributes as they were when the page was left, e.g., with one or more items in the cart, or treated as a new instance of the page with newly generated attributes, e.g. a second shopping cart that is empty. The multiple instance attribute allows the second instance of the shopping cart page in the example. The mobile interactions server 150 allows for multiple instances of a page bean if this attribute has a value of "true." The two pages with the same name are distinguished by an instance number. For example, the mobile applications server allows a Shopping Cart 1 page and a Shopping Cart 2 page.

The Menu Item Bean

A menu item bean extends the mobile applications bean with methods that should be executed when an application is first started, or when the application is exited. An applications developer extends the menu item bean for a particular application by providing event handlers. One of the event handlers includes a reference to the first page bean of the application. Any application-specific start up and exit procedures are provided as event handling methods.

The file and name of the menu item bean for a particular application are registered with the mobile interactions server by the applications developer when the application is ready for offering to users of mobile devices. At the time of registration, the applications developer also provides the mobile applications server with a label to be presented to a user when the user first starts a communication session with the mobile applications server. The label becomes one item in a menu presented to the user as a first response after the user logs in with the mobile applications server 110.

Furthermore, in one embodiment, the value of the menu item bean name attribute is used with the values of the page name and field name to uniquely identify every graphical element in the application. This property is very useful for maintaining state information as it is described in more detail in a later section.

Structure of an Application

FIG. 1C is a block diagram that illustrates how, according to one embodiment, an application may be implemented using a hierarchy of application specific mobile applications beans. At the top of the hierarchy is an application specific menu item bean 170. In this embodiment the application specific menu item bean extends the menu bean described above by including a method 171 to be executed when the application is exited. The application specific menu bean also includes a reference 179a to the first application specific page bean. In some embodiments the reference is a file name where the application specific first page bean is stored. In some embodiments the page reference is in an event handling method for the application entered event.

The first page bean 172a includes a method 175a to construct the page object and a vector 174a listing one or more application specific event handling methods 174a associated with the page. The methods may be included in the file with the page or may be in any class file associated with the application. In the illustrated embodiment, the first page constructor 175a creates instances of several field beans including field bean objects 173a and 173b. The first page constructor also lists an application specific event handling method associated with field bean 173b. The event handling methods for the page listed in vector 174 are for generic events, described in more detail below, which insulate the application from details of the mobile device 103.

With this structure the page can generate instances of field beans that depend on conditions at the time the page is generated. That is, the page-entered method of the page event handlers listed in vector 174a may include instructions that determine what additional field beans to instantiate and the values of field bean attributes based on the date or time, the identity of the user, or any information managed by the state machine about the current session with the client at the time the page is generated. For example, if the user had indicated on a previous page that the telephone numbers of two people with the name John Smith are desired, the current page can obtain that information from the state information database and add two instances of text field beans to the page built by the constructor, and use the two new text fields to display the phone numbers of the two John Smiths.

The first page bean also includes a reference 179b to a subsequent page, e.g. the next page. In the embodiment shown, the reference 179b to the next page is an attribute external to page event handling methods listed in vector 174a. In another embodiment the exit page event handling method of the listed page event handlers in vector 174a makes the reference to the next page. In still another embodiment, a field bean 173 includes the reference to the next page. In one embodiment, the application specific value of the "Next Page" attribute in a field bean object indicates the reference to the next page. An application specific page bean may include different references to different pages in the "Next Page" attributes of several different field bean objects; in this case, the next page generated by the application depends upon the field object a user of the mobile device is acting on. In some embodiments the reference is a file name where the next application specific page bean is stored.

The page beans continue for as many pages as necessary to provide the desired functionality for the application. When the last page is exited, the page event handler method of the last page issues a message indicating that no more pages follow. In this embodiment, an exit application event occurs, and the exit application event handler method 171, if any, in the menu item bean is executed. In one embodiment, to deal with any circumstance that results in no new page being generated, the application specific methods generate an exception that is a message to the mobile interactions server. Such circumstances include exiting the application, redirecting control to another network-based service, or encountering an error while executing the logic of the event handler method.

An advantage of this arrangement is that the overall application is broken up into a series of pages that each approximately correspond to the amount of information that a user of the mobile device should consider at one time. The pages are constructed and operated independently and in series so that only one occupies the processor at any one time for one session. As a result, the number of program instructions that must occupy the memory of the processor at any one time is a small subset of the overall instructions needed to provide all the functionality of the application. What information needs to be shared between one page and another is stored in the session state information maintained by the state machine of the mobile interactions server.

Another advantage of this arrangement is that each page of the application may be extended without regard to the detailed properties of individual mobile devices. Those details are handled by the methods and attributes inherited from the mobile applications beans provided to the application developer.

Mobile Interactions Server Processes

The operation of the mobile interactions server shall now be described with reference to the structures of the embodiment illustrated in FIGS. 1A, 1B, 1C and 1D. The steps followed when a client process first contacts the mobile interactions server are described in the following section on client log-in. The steps followed by the mobile interactions server 150 after receiving a subsequent request message from the client indicating actions by the user are described in the next sections. The state information maintained by the mobile interactions server to facilitate interaction during the entire course of a session between the client and the mobile applications server 110 is described in the section on session state maintenance. Separate sections below are directed to describing in more detail navigation between pages, the event-driven interface, the presentation manager, and application development. A hardware overview section is also provided.

Client Log-In

Figure 2A:
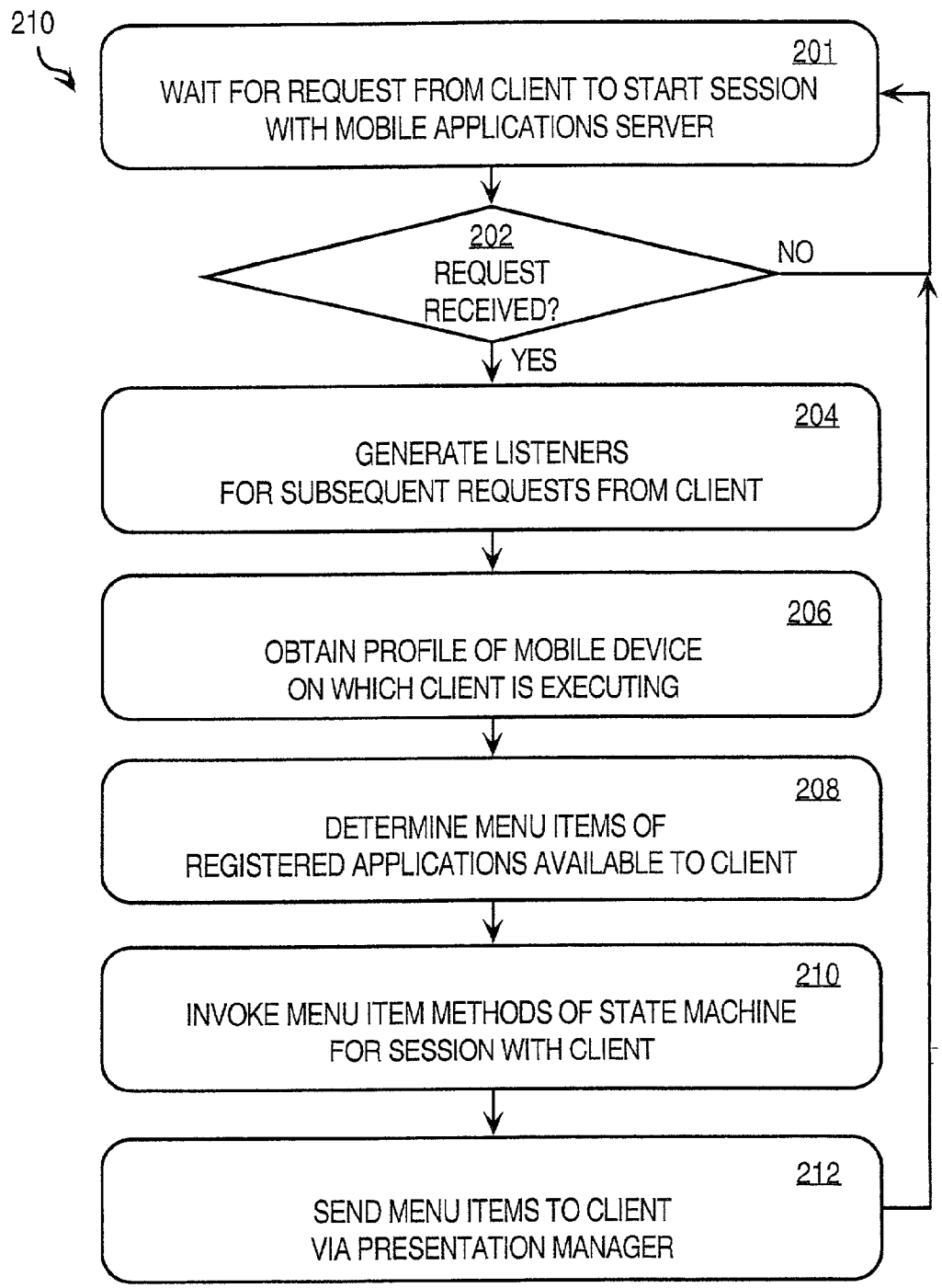
FIG. 2A is a flowchart that illustrates one embodiment of a method for a mobile interactions server to respond to a client making an initial request for services.

FIG. 2A is a flowchart that illustrates one embodiment 210 of a method for a mobile interactions server 150 to respond to a request from a client on a mobile device for services from the mobile applications server 110. For example, a user employs the mobile device to log on to the mobile applications server 110. This initial request can also be made without the log-in procedure, if the security policy does not require log-in.

In step 201, the mobile interactions server waits for a request from the client to start a session. In step 202, the mobile interactions server determines whether a request was received from the client to start a session. In other embodiments, steps 201 and 202, are replaced by different steps. For example, steps 201 and 202 are replaced by steps of an event trigger mechanism that passes control to the following steps when a request is received, without intermediate checking. Alternatively, steps 201 and 202 are replaced by a step that calls routines that implement the following steps on a predetermined schedule.

If a login is required, then control is transferred to a log-in process (not shown) and returned to step 204, if successful.

When control passes to step 204, the mobile interactions server launches listeners to respond to further requests from the client process. The client process is identified by the network address of the mobile device and the port through which the messages are arriving at the platform on which the mobile interactions server 150 is executing. A different port is assigned by the operating system of the mobile applications server for each communication protocol and the port is passed to the mobile interactions server. For example, messages using HTTP are typically assigned port 80 and Telnet messages are typically assigned to a port with a different port number. One listener responds to the initial request. A second listener responds when the request message from the client indicates the user has pressed a key. The request includes data indicating the value of the key pressed and the name of the graphical element where the cursor was located when the key was pressed. A third listener responds to a logoff request. In other embodiments the first, second and third listeners are combined. The steps in FIG. 2A performed by a listener are performed by the listener that responds to the initial request.

In step 206, information about the mobile device on which the client is executing is obtained and stored in the device profile for the session by the listener. In some mobile devices, some of this information is obtained by negotiating directly with the client process on the mobile device. During negotiations one or more messages are sent to the mobile device from the mobile applications server, and the responses are used to construct the mobile device profile or determine the device type. For example, negotiations are used in some embodiments with industrial devices such as bar code readers that communicate via the Telnet protocol. For mobile devices that do not negotiate, such as devices using the WAP protocol, information pertinent to the devices and available from the manufacturer or published sources are maintained by the mobile interactions server in a database of device properties. Based on the request from the mobile device, which includes some identifying information, such as a manufacturer name and model name and date, a device type for the mobile device is determined. The listener, or, in some embodiments, the separate presentation manager, of the mobile interactions server then retrieves device profile information from the database based on the device type.

In step 208, the listener checks a list of registered menu items, corresponding to available applications, and determines which menu items should be made available to the client requesting the session, based on the device profile. If a log-in procedure has been required, then the security policy also determines which clients have access to which applications.

In step 210, the listener invokes a new session method of a state machine library of methods to initiate management of session state information generated during the session with the client. Included in the session state information passed to the state machine method from the listener for management is information describing the connection used to route packets to the client, such as the IP address of the base station, the port number at the base station used for the wireless connection, the port number of the platform on which the mobile interactions server 150 is executing, and the menu items available to the client. The state machine generates a session object to store this state information and places the passed information into the session object. The structure of the session object is described in more detail below. In the illustrated embodiment, the state machine stores the session object in a session state database. In other embodiments, the session object is stored in other manners, such as in main memory within a special memory buffer called session memory.

In step 212, the state machine method generates a page for the mobile device. In the illustrated embodiment, the page is represented as an XML document listing the menu items to be displayed on the mobile device. The state machine method returns the XML document to the listener 152. The listener 152b employs the presentation manager 140, which reformats the page for the particular mobile device based on the device profile database 145. The presentation manager is described with more detail in a later section.

Figure 2B:
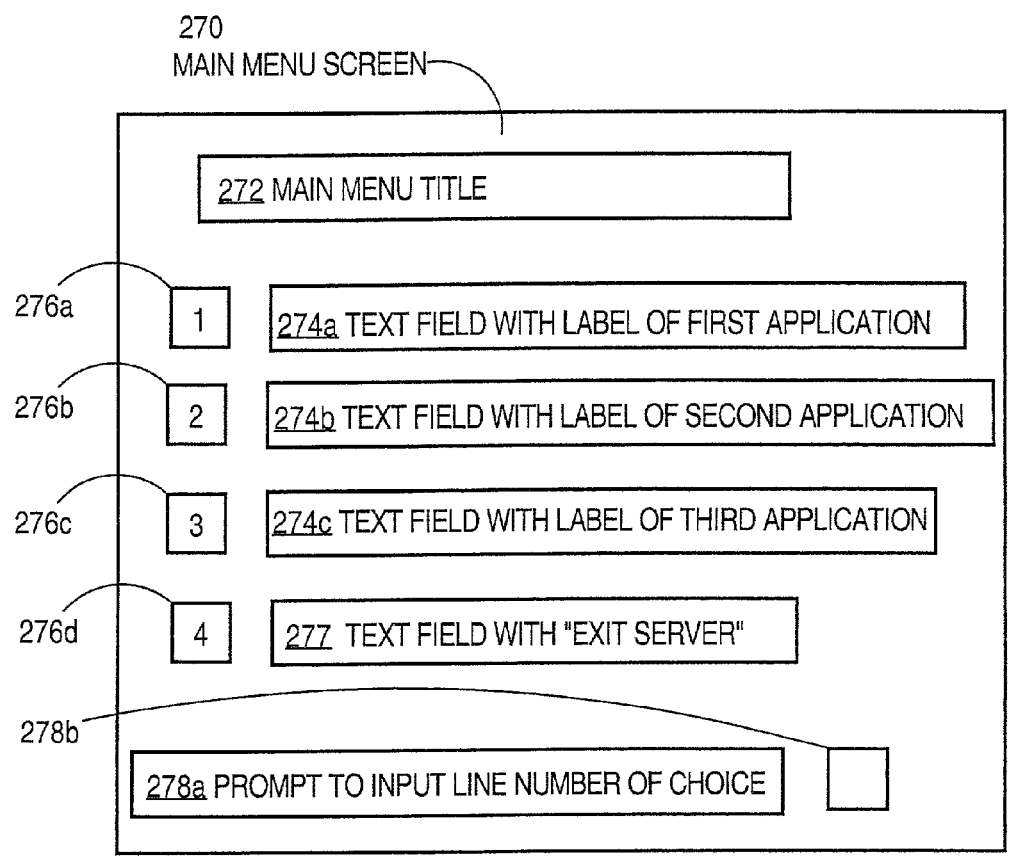
FIG. 2B is a block diagram of a main menu on a screen of a mobile device produced in response to requesting applications from a mobile applications server.

FIG. 2B shows a sample menu presented to a user on the screen of a mobile device in response to the client process request for applications from the mobile applications server 110. This screen includes a title text field 272 and three lines of selectable applications each represented by a line number in a text field 276 and a label for the application in a text field 274. A fourth option, to exit from the server, is represented by a line number in a text field 276d and a text field 277 displaying the text "exit server." An editable text input field 278 is represented by a prompt text field 278a and an input text field 278b. A user selects an option by typing a line number into text field input area 278b. The graphical elements of this screen are sent to the mobile device by the listener based on the XML document received from the state machine in step 212. The listener maintains a mapping between graphical elements, as referenced by the mobile device, and the field bean names on the current page. For example, the listener maps the graphical element reference for the text field 278 to the name of its corresponding field bean, say "Selected Menu Item" included in the XML document.

All the steps described in FIG. 2A occur outside the application specific menu item bean, page beans, and field beans. The only involvement of the application developer for these steps to occur is that the developer register the application with the mobile interactions server as described in more detail below so that the application appears as one of the options on the main menu presented to the user. In the illustrated embodiment, the state machine and the listeners handle subsequent interactions between the application and the client.

In the illustrated embodiment, control then passes back to step 201, to wait for another client to request a session.

Processing User Actions as Events

Figure 2C:
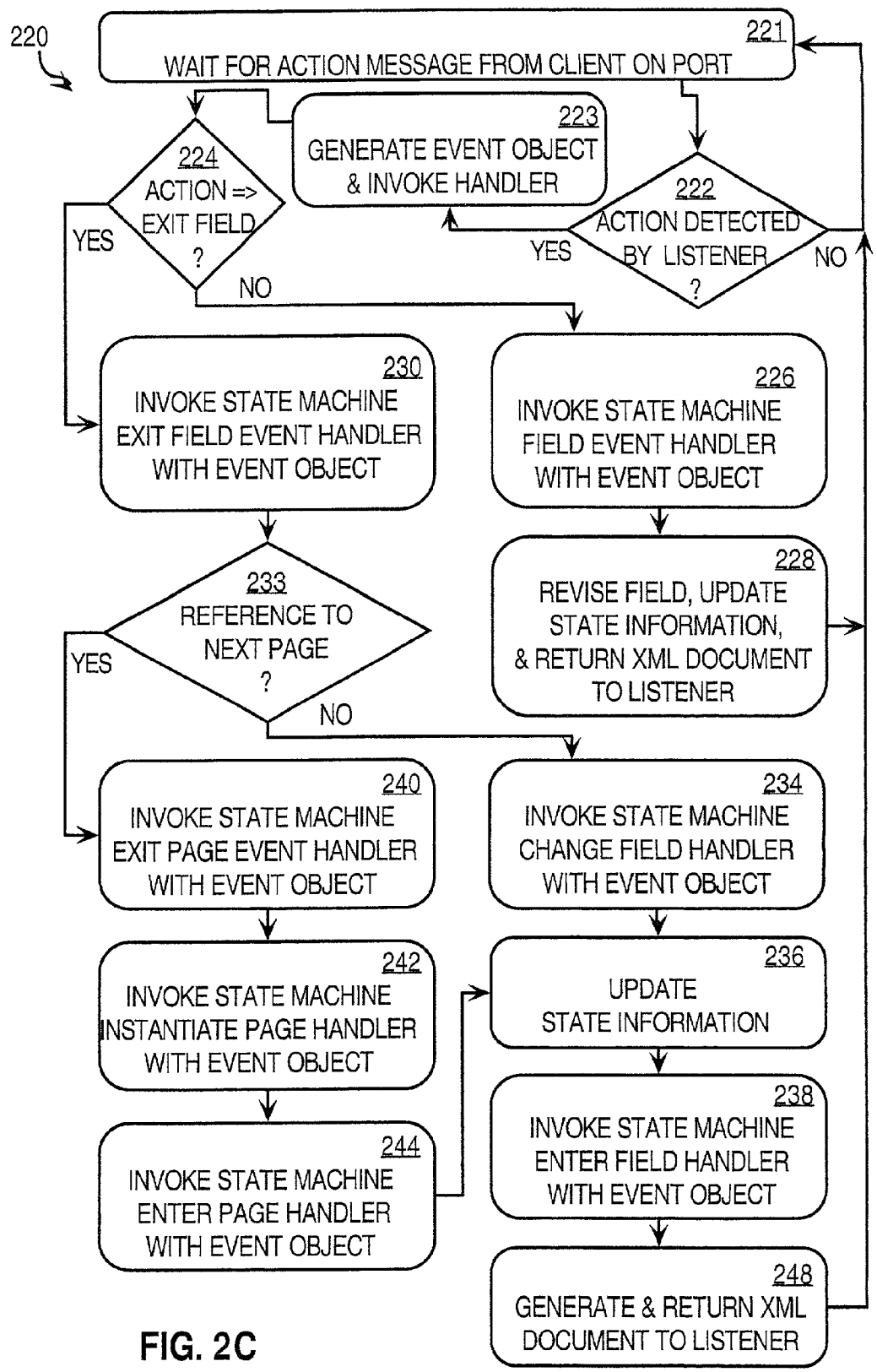
FIG. 2C is a flowchart that illustrates one embodiment of a method for a mobile interactions server to respond to a subsequent action by a user of the client process.

FIG. 2C is a flowchart that illustrates one embodiment of a method for a mobile interactions server to respond to a subsequent action by a user of the client process. In this embodiment, all these actions cause events to be generated that are passed as input parameters to event handler methods. Most events are handled by the event handling methods inherited from the bean superclass, the mobile applications bean, and the nine field type beans. The application developer generates application-specific event handling methods for a set of predefined generic events. In the following the term "handler" is used as a short form for the expression "event handling method."

In the depicted embodiment the client process 103 communicates with the mobile applications server 110 using the Telnet protocol in which each key pressed is communicated to the server as a request message. In this case the listener detects when a request message arrives on the Telnet port from the client process indicating a user has pressed a key. In other embodiments, the client may communicate with another protocol, such as HTTP extended with forms, in which the request message may indicate a higher level action, such as indicating that the user has submitted a completed form without intervening messages indicating each character typed by the user. Using HTTP, the listener detects when a request message arrives on port 80 with a string of characters indicating some of the attributes and values of the completed form.

In step 221 a Telnet listener, launched by the mobile interactions server 150 during step 204, waits for a request message from the client process indicating a user of the mobile device has pressed a key. Step 222 represents a branch point based on receiving the request message indicating a user action. If a request message indicating a user action is not received, the listener continues to wait as represented by the arrow returning control to step 221. If a request message indicating a user action is detected, control passes to step 223. For example, if a message indicates the user has pressed a numeric key while the cursor is located in the text input field 278b, then the user action is "key pressed." As another example, on the screen of FIG. 5A, the cursor may be on text field graphical element 514 placed after the character "4" when the user presses the "enter" key of the keys 104 on the mobile device.

Figure 2D:
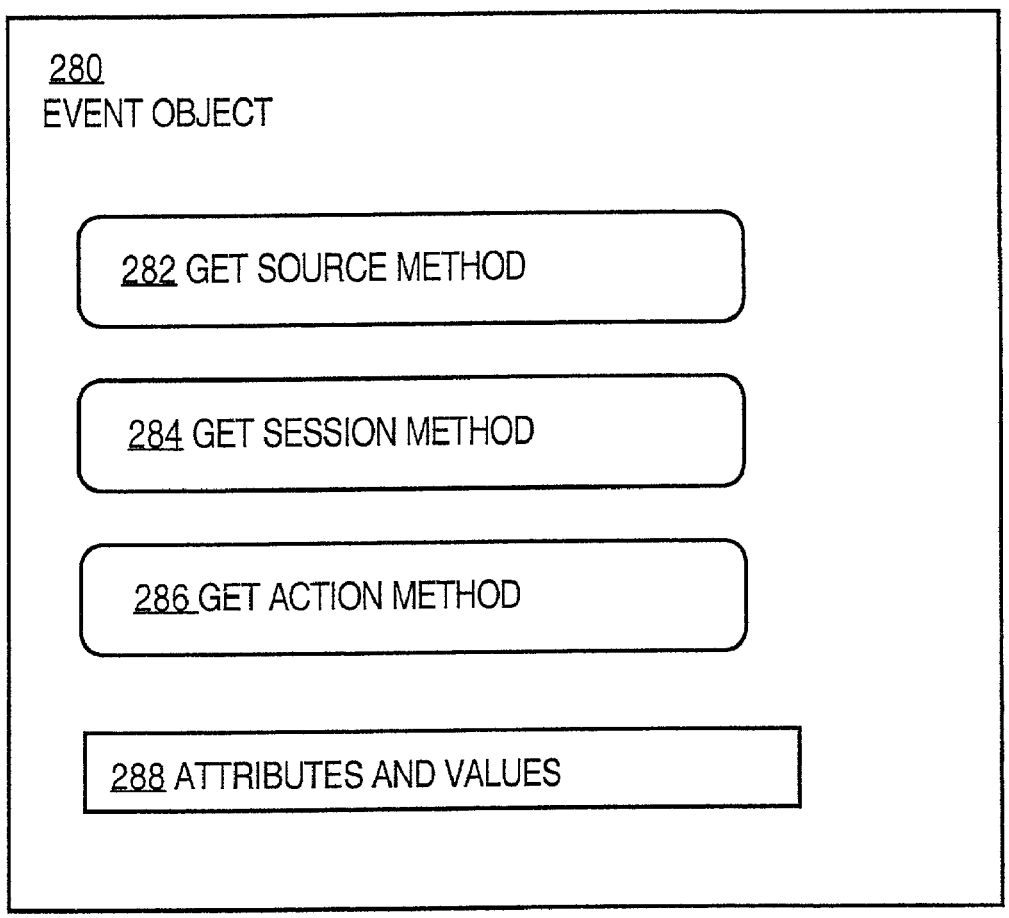
FIG. 2D is a block diagram of an event object used by the mobile interactions server.

In step 223, the listener generates an event object and invokes a handler of the state machine with the event object as an input parameter. The event object has an attribute for the key pressed and an attribute naming the field in which the cursor was located when the key was pressed. In this embodiment, an event object is an extension of a JAVA event object class. One embodiment of an event object 280 is depicted in FIG. 2D. The event object 280 includes several attributes and corresponding values 288 that hold the name of the field bean associated with the graphical element in which the cursor was located at the start of the user action and the name of the key that was pressed. For example, the attribute Name may have the value "Selected Menu Item" and the key pressed attribute may have value "3". The event object is formed to pass information about the user action to the handlers implemented in the mobile applications beans.

The event object 280 includes several methods for retrieving information from the state information managed by the state machine methods. The event object inherits a "get source" method 282 from the JAVA event object class. The get source method returns a field bean object based on the stored state information for the field bean associated with the graphical element where the cursor was located. For example, the get source method returns the text field bean object named "Selected Menu Item" associated with the text field graphical element 278 displayed on the screen of the mobile device.

The "get session" method of the event object 280 returns the session object in which information about all the field beans sent to the client and all attributes modified by a user of the mobile device. In one embodiment, a reference to the session object that can be employed to access the information in the session object is returned rather than the session object itself. An embodiment of the session object is described in more detail later.

The "get action" method of the event object returns the user action in the source field. For example, the get action method returns the string "key 3 pressed" or the string "enter key pressed."

The state machine has a handler for the example "key 3 pressed" event and generates other more generic events with more generic actions for the generic event handlers of the application, as described below. The generic events produced by the state machine include "field entered," "field exited," "page entered," "page exited," "special page key pressed," "application entered," and "application exited." Six generic actions are associated with events passed to handlers of an application. The six generic actions are "next field," "previous field," "submit page," "back page," "forward page," and "menu page." The generic events and actions insulate the application from details of determining which keys are on which mobile devices and how cursors are used in each device to move from field to field on a page.

In step 224 the state machine method determines whether the key pressed action corresponds to one of the generic events, an exit field event. For example, a field is exited when an enter key is pressed or a pointing device is clicked on a button field, or if the field does not involve a list and either a cursor up key is pressed or a cursor down key is pressed. If the key pressed indicates a field is being exited, then the state machine handler sets the action in the event object to "previous field" if the exit is indicated by a cursor up key, and "next field" if the exit is indicated otherwise. If the action does not correspond to exiting a field, then control passes to step 226. The "key 3 pressed" does not correspond to a generic event, such as field exited; thus, in this example control passes to step 226.

In step 226 a field handler of the state machine specific to the field bean type is invoked with the event object as the input parameter to deal with the pressed key. A different handler is available for each type of field bean. Handlers for the nine field type beans are built-in for the state machine and are not produced by the application developer, and are not considered application handlers. In step 228, the state machine field handler revises the field based on the key pressed, updates the state information stored about the field in the session object and generates an XML document to return to the listener for sending on to the client process on the mobile device. After step 228, control then passes to step 221 to wait for further user action.

Figure 5B:
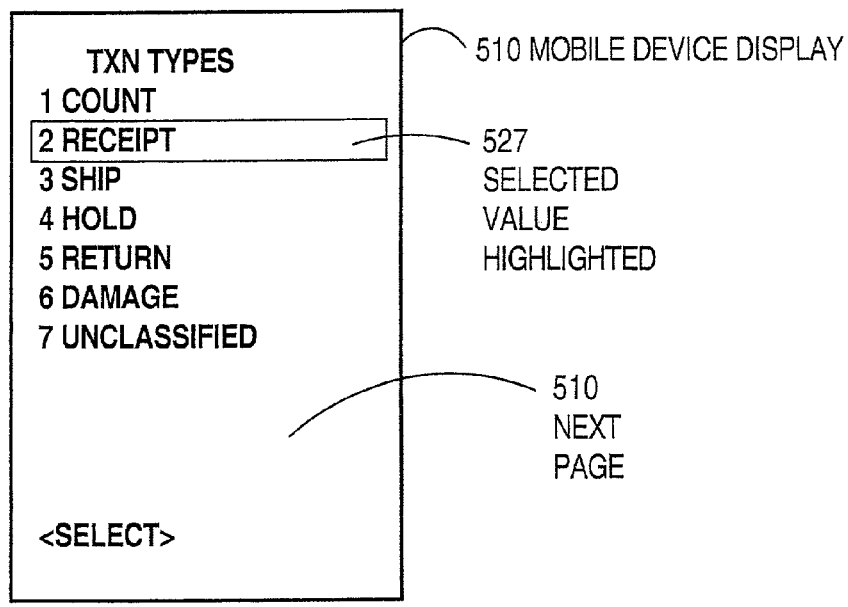
FIG. 5B is a diagram that illustrates an embodiment of a next page on a display of a mobile device.

For example, the built-in text field handler for the "key 3 pressed" event revises the Value attribute of the "Selected Menu Item" to "3" and stores this Value in the Session object and generates an XML document with the new value. In one embodiment, the XML document includes descriptions of the entire page, recovered from the session object. In another embodiment, the XML document includes just the description of the revised field object. The XML document is returned to the listener that causes the new value to be rendered on the mobile device and the cursor to be moved to the position after the "3," as is described in more detail below. For an example list field element, as depicted in FIG. 5B, a list field handler responds to a cursor down key being pressed by revising the field to show a different list item highlighted, updating the state information to indicate the highlighted item, and generating an XML document with the next item of the list highlighted and the former item, if any, changed from highlighted to not highlighted.

Processing Generic Events

If the action is associated with the generic event "field exited" in step 224, then control passes to step 230 to invoke a state machine exit field handler with the event object as the input parameter. For example if the action is associated with a generic "next field" action or a generic "previous field" action, then the action is associated with the generic "field exited" event type. A different exit field handler is invoked for each field type. The state machine includes exit field handlers and enter field handlers for the nine field types. The application can include its own application-specific handlers for the event types, when a page object is constructed. Note that the Main Menu Screen depicted in FIG. 2A is not constructed by the application but is automatically provided by the state machine and listener of the mobile interactions server. Thus no exit field handlers or enter field handlers for the field objects corresponding to the graphical elements on that page are provided by the application. On the other hand, if the field being exited was generated on a page provided by the application, then the field object information stored in the session object obtained with the event object identifies any application specific exit field handler. The state machine exit field handler determines whether the field object includes an application specific exit field handler; and, if so invokes the application specific exit field handler.

In step 233 the exit field handler determines whether a Next Page attribute contains a reference to page object of the application, or whether the exit field is the option input field of the main menu screen, or whether there is no remaining field on the page. If any of these conditions is true, control passes to step 240 described later. Otherwise, another field on the same page is being entered.

If the step 233 determines that another field on the same page is being entered, control passes to step 234 in which the state machine exit field handler invokes the state machine change field handler to leave a field without generating a new page object. In step 236 the state machine change field handler updates information in the session object about the field object being exited and determines which field object, if any, is being entered, based on the action included in the event object. For example, if the page is as depicted in FIG. 5A, and the field being exited is the text field element 514 with the prompt "ACCT" and the action is "next field" then the field being entered is the next one on the page in order, which is the text field element with the prompt "ITEM." If, instead, the action were "previous field" then the field being entered would be the LOV field element 520 with the prompt "TXN TYPE." The change field handler then adds a field entered event to the event object and a name of the field that will be entered. The source of this event does not change, it is still the field that is exited, but another field object is added to the event naming the field entered.

In step 238, the state machine invokes the state machine enter field handler for the field type of the field being entered. The state machine enter field handler determines whether the field object includes an application specific enter field handler; and, if so, invokes the application specific enter field handler. Control then passes to step 248.

In step 248 the state machine generates an XML document describing the page object, indicating which field element is the current field element and indicating the position of the cursor. In some embodiments only the changed field objects and cursor position are included in the XML document. In other embodiments the entire page object is described in the XML document. The XML document is then returned to the listener for preparing to present to the client process for display to the user of the mobile device. Control passes to step 221 to wait for another request message indicating user action at the mobile device.

If, in step 233, the exit field handler determines that a new page must be generated, it adds the "page entered" event to the event object, and control passes to step 240. In step 240, the state machine invokes an exit page handler for the current page, passing the event object as the input parameter. The state machine exit page handler determines whether the current page object includes an application specific exit page handler; and, if so invokes the application specific exit page handler, passing the event object as the input parameter. Control then passes to step 242.

In one embodiment, if the current page is the main menu page, then the state machine exit page handler uses the information in the session object to map the value of the option selected by the mobile device user on the main menu screen to a file where the application specific menu item bean and page beans are stored. The exit page handler then adds an "application entered" event to the event object and invokes the "enter application" handler of the menu item bean, passing the event object as the input parameter. The enter application handler returns a menu item object with a reference to the first page of the application. A menu item object is added to the session object in session memory.

If there is not another field on the page and the Next Page reference is empty, then the end of the application has been reached. The state machine exit page handler then adds a "application exited" event to the event object and invokes the "exit application" handler of the menu item bean. The exit application handler performs any application specific end of application functions and returns. The next page is the main menu screen and the state machine exit page handler invokes the main menu method, passing control to step 210 of FIG. 2A.

In step 242, the state machine invokes the instantiate page handler, passing the event object. This handler uses the reference in the Next Page attribute or the reference to the first page obtained through the event object to determine whether the page already exists in the session object and, if so, whether it supports multiple instances. If the page is not already in the session object, or if the page supports multiple instances, the handler invokes the constructor method for the page bean to instantiate the page. The page bean is identified in the Next Page attribute of the exited field or in the reference to the first page. The constructor method does not accept the event object as an input. The constructor method instantiates the page object and the field objects contained in the page object. The constructed page object includes a vector indicating any enter handlers and exit handlers for the page object and field objects on the page. Control then passes to step 244.

In step 244, the state machine invokes the state machine enter page handler with the event object as the input parameter. The state machine enter page handler makes the first field the current field and adds a "field entered" event to the event object. The state machine enter page handler determines whether the current page object includes an application specific enter page handler; and, if so invokes the application specific enter page handler, passing the event object as the input parameter. The enter and exit handlers included in the vector accept event objects as parameters. Therefore any field objects included on the page based on state information are instantiated by the application specific enter page handler. Similarly, any attributes that depend on the state information are assigned values in the application specific enter page handler. Control then passes to step 236 to update and store the session object, to step 238 to invoke the enter field handler for the current field on the new page, and step 248 to generate and return the XML document.

An advantage of these event handling techniques in the described embodiment is that the application developer can employ the observer-observable paradigm for software development. In the observer-observable paradigm, a program element deals only with observable objects and ignores other objects. The observer registers the objects that are to be observable and the system notifies the observer when an observable object is generated, changes, or terminates. As applied to mobile applications developers, the mobile application is built to observe certain events, e.g., the generic events. Other events, such as the user pressing each key while entering data into a text field, or the user moving a cursor up and down on a list field are not registered observables; and so the developer does not develop instructions to handle events associated with those actions. As implemented in the embodiment described, the built-in methods of the mobile interactions beans, such as the nine field type beans, handle the intra-field actions, and most of the intra-page actions, by the user.

The Built-In LOV Field Event Handling Methods

The state machine enter field handlers include built-in procedures to provide the behavior expected of the field types. For some field types the built-in behavior is complex. For example, when a LOV field is entered, such as the LOV field element 520 in FIG. 5A, the LOV-field-entered handler retrieves the contents of the LOVstatement attribute provided by the application, which is a stored procedure or an SQL statement as described above. The handler causes the statement to be executed with the parameters provided by the application and included in the InputParameters attribute. If indicated by the InputParameterTypes attribute, one or more of the InputParameters may be retrieved from the session memory, e.g., the session object. The result set produced in response to executing the LOVstatement is stored by the built-in handler, the result set is referenced by the LOV field name, for example in the session object. The result set is made up of records each of one or more subfields.

If the results set is empty after execution of the LOVstatement the text value remains unchanged, an error message such as "Invalid Value" or "No Values Found" is generated and stored, referenced to the LOV field name, such as in the session object, and data is generated indicating the cursor position remains in the field. The error message and cursor data are included in the XML document produced in step 248. If the results set contains only one record, then the one record is placed into the SelectedValues attribute of the LOV field, the Value attribute is set to a subfield of the record that has a type that matches the type in the ValueType attribute, the event object is modified to add a "next field" action, and control passes to step 230 where the built-in exit LOV field handler is invoked with the modified event object. The built-in exit LOV field handler generates data indicating the cursor is positioned at the next field.

If the results set contains several records, then the displayed subfields of the records, as indicated by the SubfieldDisplays attribute, are placed into a list by the enter LOV field handler, the event type is modified to include the special action "generate LOV page," and control passes to step 242 and following steps. In step 242 a built-in handler is invoked to instantiate the LOV page using the list. FIG. 5B is an example LOV page listing the transaction types (TXN TYPE) from which the value presented in LOV field 520 can be selected. In one embodiment, as shown in FIG. 5B, this handler includes a "select" button field. The "select" button has a NextPage attribute set to a reference to the previous page (the previous instance of the page, not a new instance of the previous page). In an embodiment in which the page is implemented as a single list field, the reference to the previous page is assigned to the NextPage attribute of the list field. In step 244 a built-in enter LOV page handler is invoked to set the selected item of the list to one of the list items, e.g., field 527. In an embodiment in which the page is implemented with a single list field, the enter LOV page handler sets the single list field as the current field. Control then passes to step 236 to update the session object to include the page object with the list corresponding to the page 510. In step 238 a LOV enter field handler is invoked with the event object. In one embodiment this handler selects one of the items of the list field as the selected item and locates the cursor on that item, e.g. field 527. In step 248 the state machine generates an XML document with the list and returns the XML document to the listener for display to the user.

In one embodiment, the user employs the up and down arrow keys without leaving the list field, through steps 226 to 228, as described above. When the user presses the enter key the state machine determines that a "next field" condition is satisfied and generates an event object with the next field and passes control to step 230. In an alternative embodiment, each cursor move is interpreted as an exit field event not associated with submitting a page, and is processed through steps 234 to 248 as described above. When in a field, pressing an enter key selects the corresponding list item, replacing any prior selections. When the user presses enter in the "select" button, then the page is submitted. In either case, a "page exited" event is added to the event object and the event is processed through steps 233 and 240 through 244.

In step 233 the reference to the previous page as the next page is detected, the state machine adds a "page exited" event to the event object and control passes to steps 240 to invoke the built-in exit LOV page handler with the event object. The built-in exit LOV page handler generates data indicating the cursor is positioned on the next field of the previous page (e.g., field 516) and the Value attribute is set to the appropriate subfield of the SelectedValues attribute. In step 242 the previous page is returned with the new selection occupying the Value attribute. In step 244 the state machine enter page handler for the previous page selects the field object corresponding to the cursor as the field being entered and invokes any application-specific enter page handler. In step 236 the session object is updated and in step 238 the state machine enter field handler is invoked for the field where the cursor is located, which itself invokes any application specific handlers. In step 248, the XML document for the current page is generated and returned to the listener.

An advantage to the application developer is that the complex behavior of the LOV field may be obtained simply by instantiating the LOV bean. The application developer does not have to generate handlers for any of the LOV field events.

Session State Maintenance

Figure 3:
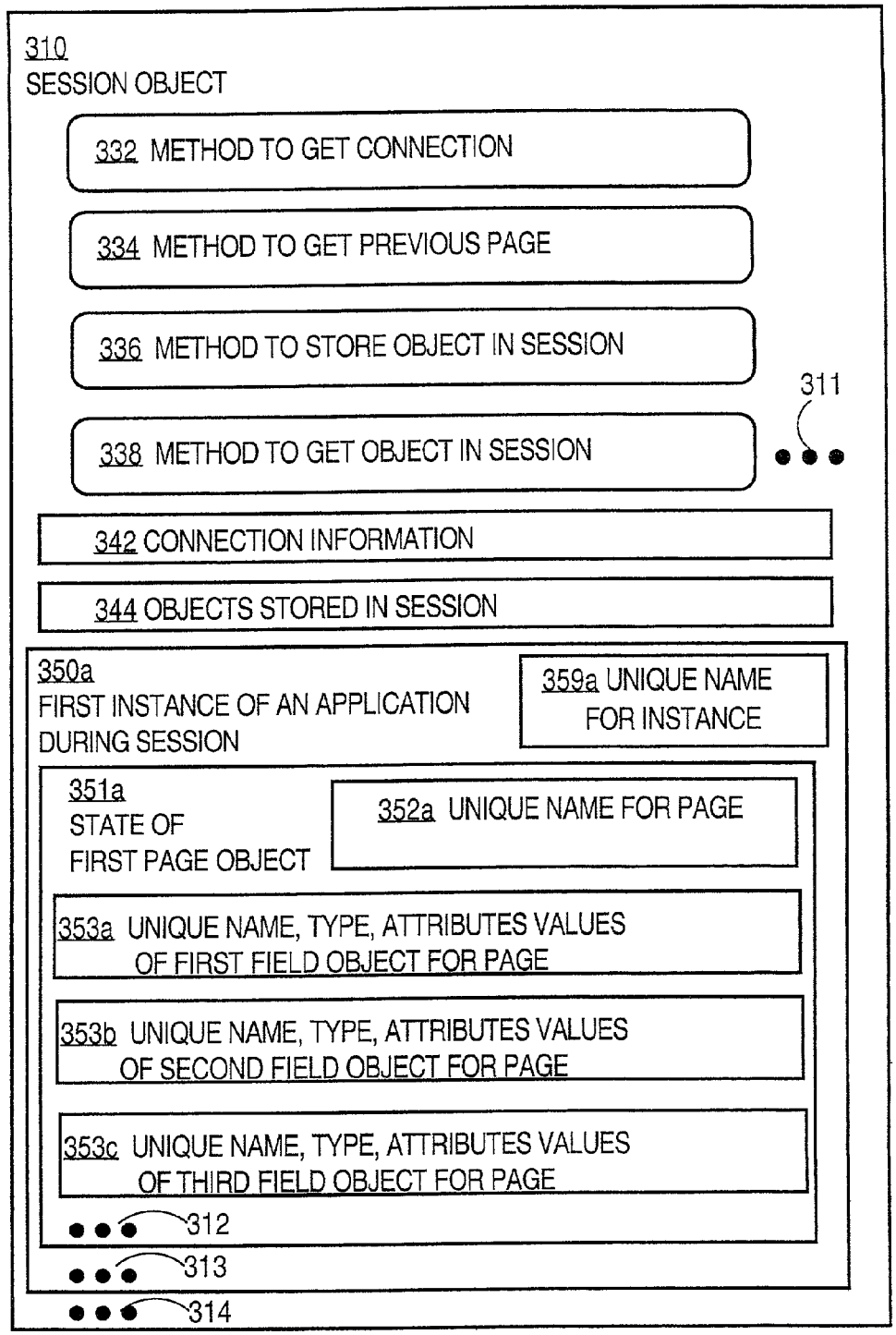
FIG. 3 is a block diagram that illustrates an embodiment of a data structure for storing session state information by the mobile applications server 110.

FIG. 3 is a block diagram that illustrates session state information stored by the state machine in the mobile applications server 110 according to an embodiment of the invention. In this embodiment, the session state information is maintained as a session object comprising attributes and methods. The attributes include connection information 342. The methods include a method 332 for getting connection information, method 334 to get the previous page, method 336 to store an arbitrary object in the session object, and method 338 to retrieve that arbitrary object. The arbitrary objects explicitly stored in the session object are represented by block 344.

Session object 310 includes a hierarchy of state information objects corresponding to the menu item objects, the page objects and the field objects in the applications in the order they were instantiated during the session. For example, an application state information object 350*a* includes information from the first instance of the application, such as a unique name 359*a* among the names of the applications available on the mobile applications server. The unique name is generated by the state machine based on the file name of the application and instance number. As each page is generated during interactions with the client process, a page state information object 351 is added to the application state information object.

For example, first page state information object 351*a* is added when the first page is generated and returned to the state machine. This object includes a property 352*a* for a unique name for the page. Object 351*a* includes state information objects 353 for each field object on the page object. A field state information object 353 includes at least a unique name for the field, an identification of the type of field, and values for at least some of the attributes of the objects belonging to that type. Ellipses 312 indicate additional field state information objects to be included in the page state information object 351*a*. Ellipses 313 indicate additional page state information objects may be included in the application state information object 350*a*. Ellipses 314 indicate additional application state information objects may be included in the session object 310.

If multiple instance pages are allowed, several instances of the same page can be maintained in the session object 310. However, if multiple instance pages are not allowed, then as a user of the mobile device steps back to a previous page, the current pages are deleted and forgotten. On the second visit to a page, the attributes values may change. For example, the value of the "TXN TYPE" LOV field in field 514 of FIG. 5A may change from "RECEIPT" to "SHIP" after obtaining user input. In this case, no record would be kept of the former values for the attributes of the items on the page. For example, a page state information object would not exist in which the "TXN TYPE" was "RECEIPT"—memory of that state of the page would be lost. Only the most recent visit to the page would be stored in the session object 310.

A unique namespace for every object generated during the session is maintained. In one embodiment, a unique name is generated for the session, a unique name is generated for an application within the session, a unique name is generated for each page within an application, and a unique name is generated for each field object within a page. Then, even though the same page name may be used in different applications or the same field name in different pages of the same application, a unique name is generated for each object by appending its name, separated by a period, after the name of its parent and continuing on to the session name. For multiple instances of the same application, page or field, an instance number can also be appended.

For example, a unique session name is generated based on the client network address appended to a port number. For example, if the IP address of the mobile device is 002.002.002.002 and the port is 19, then a unique name for the session can be constructed by appending the latter to the former (omitting periods) to yield 00200200200219. A unique name for an application executed by this client is generated from the main menu item corresponding to the application and an instance number for the application. For example, if the main menu item for the application is option "3" with a label "Inventory Database Input" associated with a JAVA file "inv.java" in directory "Mobile/Database/Inventory" of the platform of the mobile applications server 110, then a unique name for the application can be one of: "3"; "InventoryDatabaseInput"; and "Mobile/Database/Inventory/inv.java." Assuming that "InventoryDatabaseInput" is used for balancing brevity with descriptiveness, and that the application is invoked for the first time of possibly multiple invocations, the unique name for the application is "00200200200219.1InventoryDatabaseInput." A unique name for a second instance of a page bean named "Location" would then be "00200200200219.1InventoryDatabaseInput.2Location." A unique name for the first field object named "Address" on the page would then be "00200200200219.1Inventory DatabaseInput.2Location.1Address".

The unique name of an object in the namespace combined with the storage in a session memory of state information for all objects in association with their unique names allows the name to serve as a reference for all the information about that object.

The unique namespace also facilitates storage and retrieval in some embodiments. For example a database index is generated based on the unique name in one embodiment. The index maps the unique name of each object to a location in the database where the object or information about the object is stored. Then a particular object can be retrieved quickly from the database based on the unique name for the object.

In the preferred embodiment, the session object 310 is an instance of a bean class that includes as attributes the instances of the menu item beans, page beans and field beans generated during the session. For example, an instance of each page bean, including its instances of field beans, with all their attributes and attribute values is added to the session object as the page object is returned to the state machine methods. In this embodiment, the bean methods for storing and retrieving attributes and attribute values of instances of the beans are used to store and retrieve the session object, and thereby, every object included in the session object.

Thus, the session object provides persistence and serialization for the state information managed by the state machine.

Using these techniques, the state machine is able to manage the state information for the session on behalf of one or more applications during a communication session with a particular client. The state machine adds state information at each branch point of a hierarchy as a page is constructed for the client. The state machine thus develops a complete tree representing the navigational path followed by the user.

At the same time, the state machine builds a namespace that uniquely identifies each field object. The unique identifier provides access for retrieving state information from the session object. Furthermore, the state machine has sufficient information at its disposal to handle up and down movements of a cursor on a page displayed at the mobile device, so that the applications would not have to provide methods to respond to such user actions.

As described above, the page object can include field objects that depend on information in the session object, because the event object passed to the page entered handler includes a method to get a reference to the session object. For example, if the user had indicated on a previous page that the telephone numbers of two people with the name John Smith are desired, the current page entered handler can obtain that information from the session object. Then, for example, the page entered handler can add two instances of text field beans to the page object to display the phone numbers of the two John Smiths.

These techniques free the developers of applications from the responsibility for managing their session state information. This greatly simplifies and accelerates the development of applications.

Client Navigation of Application Page

To illustrate how a user navigates through pages presented by an application, consider FIG. 5A. FIG. 5A is a diagram that illustrates an embodiment of a page 510 on a display 501 of a mobile device. On this page, each graphical element appears on a different line of the display. Depending on the display device, either the entire page is displayed to the user of the mobile device, or only one or a few lines of the page are displayed to the user of the mobile device. In either case, one or more keys on the mobile device allow the user to position a cursor on one of these lines. The position of the cursor may be indicated by a movable symbol or simply by highlighting the area of the graphical element, such as by outlining, or reversing color. The user may then perform some further action on the graphical element by pressing one or more keys on the mobile device. As used herein, selecting a graphical element includes placing the cursor on the graphical element and pressing a key on the mobile device when the cursor is positioned on the graphical element.

The manner in which the graphical element is rendered may provide cues to the user about what user actions are allowed. For example, on a Telnet device, an editable text field is indicated by prompt 515 followed by a highlighted value. A button 530 is indicated by a button name between "<" and ">" characters. A graphical element indicating one choice from a list of predetermined values is indicated by a prompt followed by a highlighted field including the ">" character. In the preferred embodiment, the behavior of the display in response to user actions is provided in the built-in methods defined in the field type beans. Because of the built-in methods, there is no burden on the developer of the application to render instances of the beans on various mobile devices.

The user is free to navigate up and down this page editing the editable fields as desired. When the user is done with editing graphical elements on a page the user selects a graphical element indicating the user's desire to exit the page. In the example, the "submit" button provides that capability. Because the submit button is a button, moving the cursor to the line is not sufficient to exit the page. Rather, the user must also press another key, such as an "enter" key. If the application provides for additional functionality, then the user is presented with a new page of graphical elements with which to interact. In one embodiment, the state machine or client process provides the behavior for the cursor movement keys and changing fields on the same page; the application provides the behavior from when the page is submitted until the next page is rendered.

Interaction with a list of values field element 520 also involves displaying a new page to the user in this example. FIG. 5B is a diagram that illustrates an embodiment of a next page 510 on a display of a mobile device as a result of selecting the list of values field element. In this case, the new page includes a numbered list of values that can be selected as the current value for the LOV graphical element. In some embodiments, this list is an instance of a list bean—one of the nine field type beans. After the user selects one or more of the values on this list, the user selects the select button at the bottom of the page to make the choice effective. If only one value is allowed, as in the illustrated example, then it would be sufficient for the user to press a key when the cursor is located over the desired value. After making this choice, the user is presented with another instance of the previous page but with the chosen value in the list of values field element.

The application developer may allow a user to navigate to multiple pages from the same page. The application developer simply includes references to different pages in several different fields. For example, a page may have three text field objects and have a different page reference in the Next Page Name attribute of each of the three text field objects. Depending upon which text field the user exits, the mobile interactions server invokes the page constructor of a different page as the next page. This replaces links to other pages with field objects and page event handlers on the server. The next page is identified not with a link but with a name of the next page.

Using this method to navigate among the graphical elements of the application, only references to the graphical elements themselves are passed between the mobile applications server 110 and the client. It is not necessary to provide a full URL padded with values for parameters needed by the destination application, as in conventional methods for providing services on request over a network. It is not necessary to revise the WAP standard to allow cookies. It is not even necessary to send the full unique name of the field object or the next page name to the mobile device. All the information needed by the application is kept on the mobile applications server 110 in the state information maintained by the state machine for the session and is referenced by the unique name of the field object. A mapping between the graphical element reference sent to the mobile client and the unique name of the field object is kept at the listener and used to retrieve useful information in the session memory associated with the graphical element. When a user action is detected by the listener with reference to the graphical element, the listener maps it to the unique name of the field object that corresponds to the graphical element and passes this information to a method, such as an event handler. The method obtains any information needed from the session memory using the unique name of the field object.

Figure 4A:
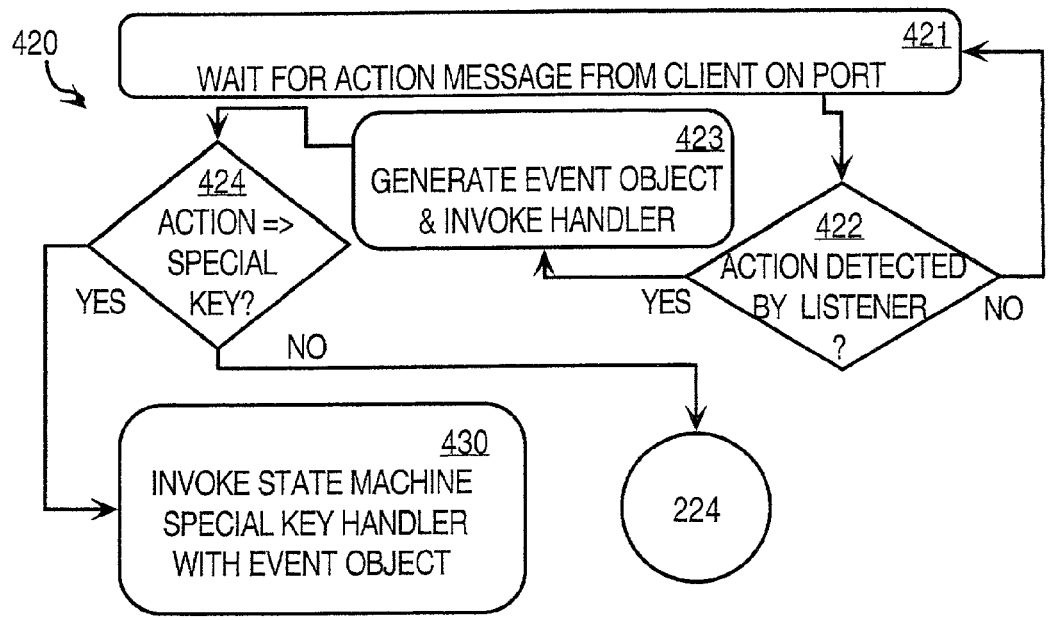
FIG. 4A is a flowchart that illustrates a method for handling a special key event.

Navigation from one page to another is also accomplished in some embodiments using special navigation keys and an event handler for the special keys. FIG. 4A illustrates the flow associated with a special key event. Six generic actions are associated with events passed to handlers of an application. The six generic actions are "next field," "previous field," "submit page," "back page," "forward page," and "menu page." The first three have been described as associated with a cursor down, cursor up and enter key with respect to FIG. 2C. The last three actions, "back page," "forward page," and "menu page," are generated in response to a user pressing a special key, such as "ALT" with the cursor up, cursor down, and enter keys, or with keys F1, F2 and F3 on a personal computer keyboard. Steps 421, 422 and 423 correspond to steps 221, 222, 223 in FIG. 2C, respectively, and represent a listener waiting for and detecting a request message indicating a keystroke by the user, generating an event and invoking a state machine event handler. In step 424, the state machine handler determines whether the keystroke described in the event object is associated with a special key. If not, control passes to step 224 in FIG. 2C to determine whether the keystroke is associated with an exit field. Otherwise, control passes to step 430.

In step 430, the state machine invokes a state machine special key handler with the event object, which invokes an application specific special key handler, if one is provided for the page. The state machine special key handler includes methods for retrieving pages from the session object in either direction from the current page or to exit the application and return to the main menu and to return the resulting XML document to the listener. The forward page action reverses the back page action; if the current page is the last instantiated page, then the forward page action has no effect. The application specific special key handler allows the application developer to provide logic for dealing with the special keys before invoking the state machine methods for moving back or forward through the pages stored in the state machine.

This page by page navigation leaves more room in the limited memory of the mobile device to present the user with more options than is often possible using either cookies or URLs with parameter information, as in the conventional approaches.

Event Driven Interface

In the illustrated embodiment, in which interactions with the client are segregated from the data and logic of the application, the application interacts with a state machine of a mobile interactions server. In the illustrated embodiment, the application receives input from the state machine as generic events, rather than device-specific keystroke events. Consequently, the application in this embodiment includes one or more methods called event handling methods, or simply handlers, to respond to the generic events issued by the state machine. The state machine includes handlers for the all the events and determines whether the application has application specific handlers for the event, as described above with respect to FIG. 2C.

A particular handler for a page object observes only particular events for the pages that instantiate it, not other events or events for other pages. Similarly, a particular handler for a field object observes only particular events for the fields that instantiate it, not other events or events for other fields. This technique implements an observer-observable paradigm in which the events are the observables and the object with included handlers are the observers.

The listeners respond to transport layer request messages from the client process. The requests involve specifics of the base station protocols from which the application is being insulated. The application layer events produced by the listeners and the generic events produced by the state machine are designed to continue to insulate the application from the keystroke specifics of interacting with any of a number of the mobile devices. The generic events for which the application developer may include application-specific handlers are:

field entered
field exited
page entered
page exited
special page key pressed
application entered, and
application exited.

Within each handler for these events, application specific behavior is programmed that depends on one or more of the six generic actions "next field," "previous field," "submit page," "back page," "forward page," and "menu page" generated by the mobile interactions server in response to one or more keystrokes by a user of the mobile device.

FIG. 4B is a flow chart for some exception handlers of the mobile interactions server. Exceptions are special events that cause corresponding exception handlers to be invoked. In one embodiment, the mobile interactions server includes built-in exception handlers at least for the exceptions depicted in FIG. 4B.

In step 441 an application specific page event handler is invoked by the corresponding state machine page event handler. The page event is either a page entered event or a page exited event or a special key pressed event. If the event handler does not return control to the invoking method, the event handler throws an exception. Step 442 represents a branch point for the case in which no exception is thrown. If no exception is thrown, control passes back to the invoking method in step 443 to invoke the next handler for the event object.

If the event handler determines that a condition for termination of the application has occurred, the handler throws a "no more pages" exception. Step 444 represents the branch point for the case in which the exception is a "no more pages" exception. In step 445 the exception handler for the "no more pages" exception invokes the state machine exit application method, which determines whether there is an application specific exit application handler in the application's menu item bean. As described above, after the application specific exit application handler is invoked, the state machine regenerates the main menu and presents the main menu to the client process through the presentation manager.

If the event handler determines that a request should be issued to another resource on the network, such as a database server, the handler throws a redirect exception. Such a redirect is expected only from a page entered event handler for a page. The other resource is identified by its URL, complete with any parameters needed to particularize the request. For example, if the other resource is a database server, the URL includes the SQL statement that specifies the database operation desired. The redirect exception includes the URL loaded with input parameters. In step 446 it is determined that the exception is a redirect to a URL and control passes to step 447. In step 447 the redirect exception handler sends a request addressed to the URL, receives an HTML document in response, adds the HTML to the session object in association with the page and invokes a method of the page, such as the page entered handler or the page exited handler, the latter shown in FIG. 4B. The page method invoked produces or modifies field objects on the page based on the HTML document.

Though depicted in FIG. 4B as being thrown by a page event handler, the next three exceptions can be thrown by a field event handler or a menu item event handler as well. If the event handler throws an abort handler exception, as indicated by the branch point in step 450, then control passes to the abort exception handler which performs step 451. In step 451 the exception handler skips any other handlers of the event object. Data is generated that indicates the location of the cursor is in the graphical element corresponding to the field object that is the source of the event object.

If the event handler throws an interrupted handler exception, as indicated by the branch point in step 452, then control passes to the interrupted exception handler which performs step 453. In step 453 the exception handler invokes the other handlers of the event object. Data is generated that indicates the location of the cursor is in the graphical element corresponding to the field object that is the source of the event object.

If the event handler throws a default-only handler exception, as indicated by the branch point in step 454, then control passes to the default-only exception handler which performs step 455. In step 455 the exception handler skips the other handlers of the event object. Data is generated that indicates the location of the cursor is in the graphical element corresponding to the field object that is the source of the event object. The state machine handler for that field object is then invoked, if not already invoked.

The proper application handler is invoked during the corresponding event through the event driven interface. As noted above, an interface specifies the name and type of the parameters of a method and the name and type of the returned value, if any.

Table 10 shows statements used to define the event handlers interface. The event handlers respond to the generic events generated by the mobile interactions server rather than to transport layer events that the listener 152 responds to. In the terminology used in the following tables, the "Listeners" are the application specific event handlers that are invoked by the mobile interactions server when a generic event is generated.

TABLE 10

An event handling method interface

| statement number | JAVA statement defining Event Handler (Listener) Interface |
|---|---|
| 1 | public interface MWAListener extends java.util.EventListener { } |
| 2 | public interface MWAFieldListener extends MWAListener { |
| 3 | void fieldEntered (MWAEvent e) throws AbortHandlerException, |
| 4 | InterruptedHandlerException, DefaultOnlyHandlerException; |
| 5 | void fieldExited (MWAEvent e) throws AbortHandlerException, |
| 6 | InterruptedHandlerException, DefaultOnlyHandlerException; |
| 7 | } |
| 8 | public interface MWAPageListener extends MWAListener { |
| 9 | void pageEntered (MWAEvent e) throws AbortHandlerException, |
| 10 | InterruptedHandlerException, DefaultOnlyHandlerException, |
| 11 | RedirectHandlerException; |
| 12 | void pageExited (MWAEvent e) throws AbortHandlerException, |
| 13 | InterruptedHandlerException, DefaultOnlyHandlerException, |
| 14 | NoMorePagesHandlerException; |
| 15 | void specialKeyPressed (MWAEvent e) throws AbortHandlerException, |
| 16 | InterruptedHandlerException, DefaultOnlyHandlerException; |
| 17 | } |
| 18 | public interface MWAAppListener extends MWAListener { |
| 19 | void AppEntered (MWAEvent e) throws AbortHandlerException, |
| 20 | InterruptedHandlerException, DefaultOnlyHandlerException; |
| 21 | void AppExited (MWAEvent e) throws AbortHandlerException, |
| 22 | InterruptedHandlerException, DefaultOnlyHandlerException; |
| 23 | } |

Line 1 indicates that the mobile interactions server event handler, herein named the "MWAListener" where MWA stands for mobile wireless applications, is an interface that extends the EventListener interface provided by the java utilities package "java.util."

Lines 2 though 7 further define the interface for the field event handler, herein named "MWAFieldListener for generic field events. These statements indicate that the field event interface extends the mobile interactions server event handler interface by defining two event handling interfaces. In lines 3–4, a fieldEntered handler interface is defined that takes an event object "e" of type "MWAEvent" and may throw any of the three named exceptions. The MWAEvent is defined elsewhere in the JAVA class file where the statements of Table 10 are stored. In lines 5–6 a fieldExited handler interface is defined with similar properties.

Similarly, lines 18 through 23 further define the interface for the application level (menu item) event handler, herein named "MWAAppListener" for two generic events. This interface defines the AppEntered handler interface and an AppExited handler interface defined similarly to the Field-Entered and FieldExited interfaces described above, respectively.

Similarly, lines 8 through 17 further define the interface for the page event handler, herein named "MWAPageListener" for three generic events. This interface defines the PageEntered handler interface and an PageExited handler interface defined similarly to the FieldEntered and FieldExited interfaces described above, respectively. Furthermore, as indicated in line 11, the PageEntered handler may also throw a "RedirectHandlerException" to redirect the mobile interactions server to a network resource with a specified URL, as described above. Also, as indicated in line 14, the PageExited handler may throw a "NoMorePagesHandlerException" to allow the mobile interactions server to invoke the AppExited handler, as described above. In addition, the MWAPageListener interface includes another interface for the specialKeyPressed handler as defined in lines 15–16.

Table 11 shows statements used to implement an event handler interface in one embodiment. In this example, application-specific handlers are implemented only for the generic event for a special key being pressed, used during page navigation, and not for page entered and page exited events of the page interface.

parameter "MWA_BACK" is the same, ignoring case, as the text string returned from the "getAction" method of the event object "e." MWA_BACK" is the special action in this embodiment corresponding to the "page back" action described above. If the expression in line 6 is true, then the instruction in lines 7–8 are followed. If not, the instructions on lines 11–13 are followed. In line 7 it is determined whether the source of the event is named "PAGE2", if so the MWA library routine setError is invoked to throw an exception. The effect of lines 6–9 is to throw an exception to the mobile interactions server if the user tries to press a special key signifying a page back action while the page named "PAGE2" is being displayed. This block prevents a user from navigating to pages visited prior to PAGE2.

The statements in lines 11–13 are followed if the user is paging back from some other page. These instructions add the word "Again" to the title field of the page being revisited

TABLE 11

An example event handling method

| statement number | JAVA statement |
|---|---|
| 1 | public class NavigHandler implements MWAPageListener{ |
| 2 | void pageEntered (MWAEvent e) { } |
| 3 | void pageExited (MWAEvent e) { } |
| 4 | void specialKeyPressed (MWAEvent e) { |
| 5 | MWASession S = e.getSession( ); |
| 6 | if (e.getAction( ).equalsIgnoreCase("MWA_BACK")) { |
| 7 | if (e.getSource( ).equalsIgnoreCase("PAGE2") { |
| 8 | MWALib.setError( ); |
| 9 | } |
| 10 | else{ |
| 11 | PageBean PP = S.getPreviousPage( ); |
| 12 | TextFieldBean TF = S.getField(PP.Name + ".Title"); |
| 13 | TF.setPrompt(TF.getPrompt + " Again"); |
| 14 | } |
| 15 | } |
| 16 | if (e.getAction( ).equalsIgnoreCase("MWA_FORWARD")) { |
| 17 | MWALib.setError( ); |
| 18 | } |
| 19 | if (e.getAction( ).equalsIgnoreCase("MWA_MENU")) { } |
| 20 | } |
| 21 | } |

The statement in line 1 indicates that the class named "NavigHandler" provides the instructions for the methods that are consistent with the MWAPageListener interface. That is, the methods of NavigHandler have the names, parameter names and types, and return types specified in the MWAPageListener interface listed in Table 10.

Lines 2–3 indicate that two methods do almost nothing. The pageEntered method and the pageExited method simply accept the event object as input and return immediately. This means that all the functionality performed on entering and exiting pages is based on the state machine methods alone. The methods perform no application-specific functions.

The statements on lines 4–20 are the instructions for a specialKeyPressed method. Line 5 indicates the "getsession" method of the event object "e" is invoked to return a session object (type MWASession defined elsewhere in the java code and not shown here) associated with the event object. The developer has chosen to call this session object "S" for purposes of this method. In line 6 the term "MWA_BACK" is compared to the generic action based on the user input that is included in the event object "e." The comparison method that disregards capitalization called "equalsIgnoreCase" returns a value "true" if the term input as a in response to the page back action. These instructions illustrate the use of the state information maintained by the state machine in a session object by an application. The statement in line 11 indicates that the previous page is obtained using the "getPreviousPage" method of the session object S, and assigned to a PageBean object named "PP." This page bean has a name indicated by PP.Name. A field named "Title" on the previous page is referenced in the session object by a unique name in the namespace as described above, by appending the field name to the page name. Thus the expression 'PP.Name+"Title"' indicates the unique name of the field. In line 13 the text field object named Title on the previous page is placed in a text field object called "TF." The statement on line 13 indicates that the string in the prompt field of the Title text field is set, using the text field bean method "setPrompt," to the text passed as a parameter. The text passed as a parameter is the text already in that field, obtained using the text field bean method "getPrompt." with the word "Again" appended.

The statements in lines 16–17 do not allow a user to page forward, even after paging back through an application. The user is forced to submit each page using the normal proce dures, not using the special key for paging forward. The statement in line 16 determines whether the action is "MWA_FORWARD." If so, the statement in line 17 is followed which invokes the setError method to throw an exception.

ment. In this example, a LOCATION page defines two text fields, A and B, for reporting the address, and adds the two text fields to the page. Table 12 also employs event handlers to allow a text field to be affected by user actions in another text field.

TABLE 12

An example page bean using the event handling method of Table 11

| statement number | JAVA statement |
|---|---|
| 1 | public class LOCATION extends PageBean{ |
| 2 |     LOCATION( ) { |
| 3 |         this.addListener ( new NavigHandler ( ) ); |
| 4 |         this.addListener ( new AListener ( ) ); |
| 5 |         this.addListener ( new BListener ( ) ); |
| 6 |         TextFieldBean A = new TextFieldBean ( ); |
| 7 |         A.setName ("AddressA"); |
| 8 |         A.setValueType ("S"); |
| 9 |         A.setPrompt ("Street Address"); |
| 10 |         A.setLength (30); |
| 11 |         A.addListener ( new Blistener ( ) ); |
| 12 |         TextFieldBean B = new TextFieldBean ( ); |
| 13 |         B.setName ("AddressB"); |
| 14 |         B.setValueType ("S"); |
| 15 |         B.setPrompt ("City/State/Zip"); |
| 16 |         B.setLength (30); |
| 17 |         this.addFieldBean (A); |
| 18 |         this.addFieldBean (B); |
| 19 |     } |
| 20 | } |
| 21 | public class AListener implements MWAPageListener { |
| 22 |     public void pageEntered (MWAEvent e) { } |
| 23 |     public void pageExited (MWAEvent e) { } |
| 24 |     public void specialKeyPressed (MWAEvent e) { } |
| 25 | } |
| 26 | public class BListener implements MWAFieldListener, MWAPageListener { |
| 27 |     public void pageEntered (MWAEvent e) { } |
| 28 |     public void fieldExited (MWAEvent e) { |
| 29 |         if( e.getOwner( ).equalsIgnoreCase ("AddressA") ) { |
| 30 |             MWASession S = e.getSession( ); |
| 31 |             TextFieldBean TF1 = S.getField("LOCATON.AddressA"); |
| 32 |             TextFieldBean TF2 = S.getField("LOCATON.AddressB"); |
| 33 |             B.setPrompt ( TF1.getValue + " is in which " + TF2.getPrompt ); |
| 34 |         } |
| 35 |     } |
| 36 |     public void fieldEntered (MWAEvent e) { } |
| 37 |     public void pageExited (MWAEvent e) { } |
| 38 |     public void specialKeyPressed (MWAEvent e) { } |
| 39 | } |

The statement in line 19 determines whether the action is the "page to menu" action represented by "MWA_MENU" in this embodiment. If so, the method simply returns without doing anything more. Therefore the menu action is handled entirely by the state machine menu special key event handler.

The NavigHandler of Table 11 is used on pages that the developer wants to prevent the user from leaving by paging forward, or prevent the user from leaving by paging back beyond PAGE2. The developer warns the user that a page is reached through a page back action by adding the word "Again" to the title each time. None of the statements in Table 11 require the developer to know any specifics about the mobile device on which the client is operating. Furthermore, the developer is not required to know the details about how the state information employed is stored or retrieved. The state information is readily available for any event handler that employs it.

Table 12 shows statements used to include the event handler defined in Table 11 in a page bean in one embodi- The statement in lines 1–20 define a LOCATION page bean by extending the mobile interactions server page bean. This LOCATION page bean inherits all the attributes and methods of a mobile applications page bean described above; and the LOCATION page bean is instantiated at runtime to generate a LOCATION type page object.

The statement in line 3 indicates the event handling methods of the NavigHandler class, defined in Table 11, are instantiated in this page bean. The addListener method of JAVA beans is employed to instantiate the methods of the NaviHandler. This statement ensures that when a LOCATION page object is entered or exited the NavigHandler method will be invoked.

The statements in lines 4–5 instantiate event handling methods defined by the classes AListener and BListener defined in lines 21–25 and 26–39, respectively. The only event handler with application specific logic in these two classes of methods is a field exited handler defined in the BListener in lines 28–34. These statements are described in greater detail below. Because the AListener does not provide any application specific logic in this embodiment, the same effect would be obtained if the AListener class had not been included.

The statements in lines 6–10 instantiate a text field bean and assign values to the attributes Name, ValueType, Prompt and Length. The statement in line 6 defines the object A of type TextFieldBean to be a new instance of the text field bean. When instantiated in line 6, the object A has the default attributes defined in Table 1 for a text field bean object. For example, the text field is editable (the Editable attribute is "true"). Thus the object A can be used to accept user input text. The bean "set attribute" methods are used to assign values that override the default values in lines 7–10. As a result of these assignments, text field object A on Page LOCATION has a bean name "AddressA" and prompts a user for input with the text string "Street Address."

The statement in line 11 associates an event handler with events that involve object A. The bean method addListener of the text field bean object A is employed to add an instance of the event handlers of the class BListener to the object A. The effect of adding these event handlers is described below.

The statements in lines 12–16 for text field bean object B correspond to the lines 6–10 for text field bean object A. The only difference is that the bean name of object B is "AddressB" and the prompt is "City/State/Zip." No event handler is added to the text field bean object B.

The statements in lines 17–18 employ a bean page method named "addFieldBeans" to add field beans to the page when the page is instantiated. The statement in line 17 adds the instance of field A to the LOCATION page when the page is instantiated, at runtime. The statement in line 18 adds the instance of field B to the LOCATION page when the page is instantiated.

Lines 21–39 of Table 12 include statements that define the application specific event handler methods in the classes AListener and BListener. Only the "fieldExited" handler of the BListener, in lines 28–36, includes application specific logic. When a field associated with the BListener is exited in response to a user operating a mobile device, the handler is invoked, and the expression in the statement in line 29 produces a value of "true" if the source, or "owner," of the event is a field named "AddressA." The expression uses the event object method "getOwner" and the getOwner method "equalsIgnoreCase" to determine whether the source is a field named "AddressA". If this expression is not true, then the handler simply returns without doing anything more.

The object A is associated with the BListener by the statement in line 11. Thus, if the user strokes a cursor up or a cursor down or an enter key while the cursor is located on a graphical element associated with object A, then the event handler in lines 28–36 is invoked. In this case, the expression evaluated in line 29 is true, the source of the event is the field object A with name "AddressA."

The statement in line 30 is then executed to obtain the session object from the event object so that state information can be obtained and used. The statements in line 31 and 32 create local text field bean objects TF1 and TF2 to hold the bean objects returned from the getField method of the session object S. Each of the desired fields is obtained by reference using the unique name generated by appending the field name to the page name "LOCATION." In line 33 the prompt for the AddressB object is replaced by a string consisting of the Value in the AddressA object at the time the field is exited with the words "is in which" appended and the former value of the prompt, also appended. In this way, the information input into the field object A becomes part of the prompt for field object B.

For example, a user has typed the text "1600 Pennsylvania Ave." into a graphical element corresponding to field object A, and pressed the enter key. This causes the application-specific event handler "exitField," of BListener associated with object A to be invoked. The handler retrieves the value of object A using the object session and incorporates that string into the prompt string for field B, which now reads "1600 Pennsylvania Ave. is in which City/State/Zip."

Using this event driven interface, events are triggered in the application layer, allowing a developer to program applications as a hierarchy of observers each dealing with a manageable number of observables. Application specific event handlers can be included in field objects, page objects and the menu item object of the application hierarchy to provide the desired behavior for the application. There is no restriction on how many handlers an application can define. Built-in state machine event handlers insulate the application handlers from low level user actions such as pointing device manipulation and individual keystrokes. The built-in state machine event handlers also provide automatic navigation from page to page of the application. In addition, the application specific handlers may throw exceptions to invoke built-in exception handlers for obtaining a response from a separate network resource, for exiting an application specific handler abnormally, and for terminating the application.

Multiple-Device Presentation Manager

Figure 6A:
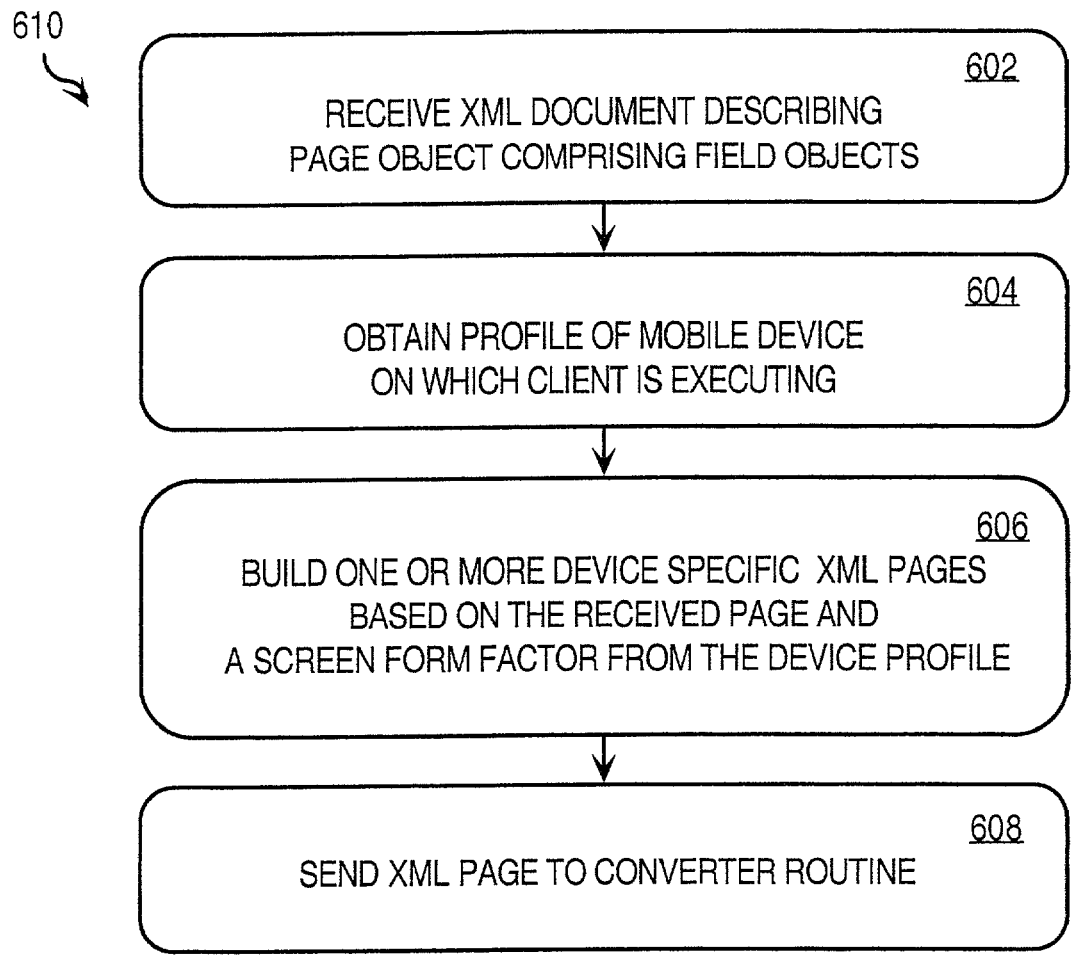
FIG. 6A is a flowchart that illustrates one embodiment of a method for a device-sensitive presentation manager to prepare page output for a particular mobile device.

FIG. 6A is a flowchart that illustrates one embodiment 610 of a method for a device-sensitive presentation manager to prepare page output for a particular mobile device. In the illustrated embodiment shown in FIG. 1D, the presentation manager 140 is a process within the listener 152b of the mobile interactions server 150b. In another embodiment, the device-sensitive presentation manager is a process of the mobile interactions server that is separate from the listener.

In step 602, the presentation manager receives an XML document describing a page object or field object for rendering at the client process on the mobile device. For example, a XML document describing a page object is received that is sent with the original menu in step 212 of FIG. 2A. As another example, a page object is received that is sent from an application to the state machine and from the state machine to the presentation manager in steps 248 of FIG. 2C. At this stage, it has not been determined whether the entire page will fit on the display or in the page buffer of the mobile device. The page object represents the device-independent view from the application perspective concerning the amount of information the user of the mobile device should have at one time to effectively navigate through the application.

In step 604, the presentation manager obtains information about the specific mobile device on which the client is executing. This information is obtained from the device profile 145 (FIG. 1D), and is constructed when the session began, as described above in FIG. 2A at step 204. This device-specific information includes a form factor describing the dimensions of the display, capabilities of the display, input buffer size, or other device specific information.

In step 606, the presentation manager builds one or more pages in a common markup language based on the received page object and the display form factor from the device profile. For example, if the page object includes 14 field beans as shown in FIG. 5A, but the particular mobile device to which the page is to be sent is so tiny that it can only display four lines at a time and its page buffer can only hold the text for 128 characters, including non-displayed characters like line end, tab and page end, then the entire page object cannot be sent to the particular mobile device at one time.

An embodiment of step 606 divides the information shown in FIG. 5A, and described in the common markup language, such as XML, among device-specific pages. For example, an embodiment of step 606 generates four device-specific pages, each with one line displaying both the page title and the submit button, while the other three lines on each device-specific page display three of the remaining 12 field beans. Each device-specific page includes a subset of the graphical elements in the page object. Among the graphical elements in the subset is the current graphical element where the cursor is located, also called the graphical element in focus. In one embodiment only the device-specific page for the subset including the graphical element in focus is formed.

In this embodiment, the device-specific pages are expressed in a common markup language. In the preferred embodiment, XML is used as the common markup language. The use of XML is advantageous because, among other reasons, converters already exist that convert XML documents to HTML documents for use by browsers and WML documents for use by WAP devices as well as for HDML, and VoxML.

In step 608, the device-specific XML pages are sent to a converter routine 114 to convert them to a format for the client protocol, such as WML, HDML. VoxML, Telnet and HTML.

When a page object generated by the application has been reformatted into more than one device-specific pages, the user of the mobile device may use the cursor placement keys, such as an up key and a down key, to move off a particular device-specific page. For example, the user of the mobile device hits a down key when the cursor is positioned on the fourth and final line of the device-specific page described above with respect to step 606 of FIG. 6A. According to one embodiment, the device handler of the application does not include logic to handle this circumstance. The application is unaware of the device-specific pages built by the presentation manager. According to this embodiment, the listener still invokes the state machine method for the key pressed and the state machine generates a responsive XML document and the presentation manager re-generates a device-specific page that includes the current field.

Figure 6B:
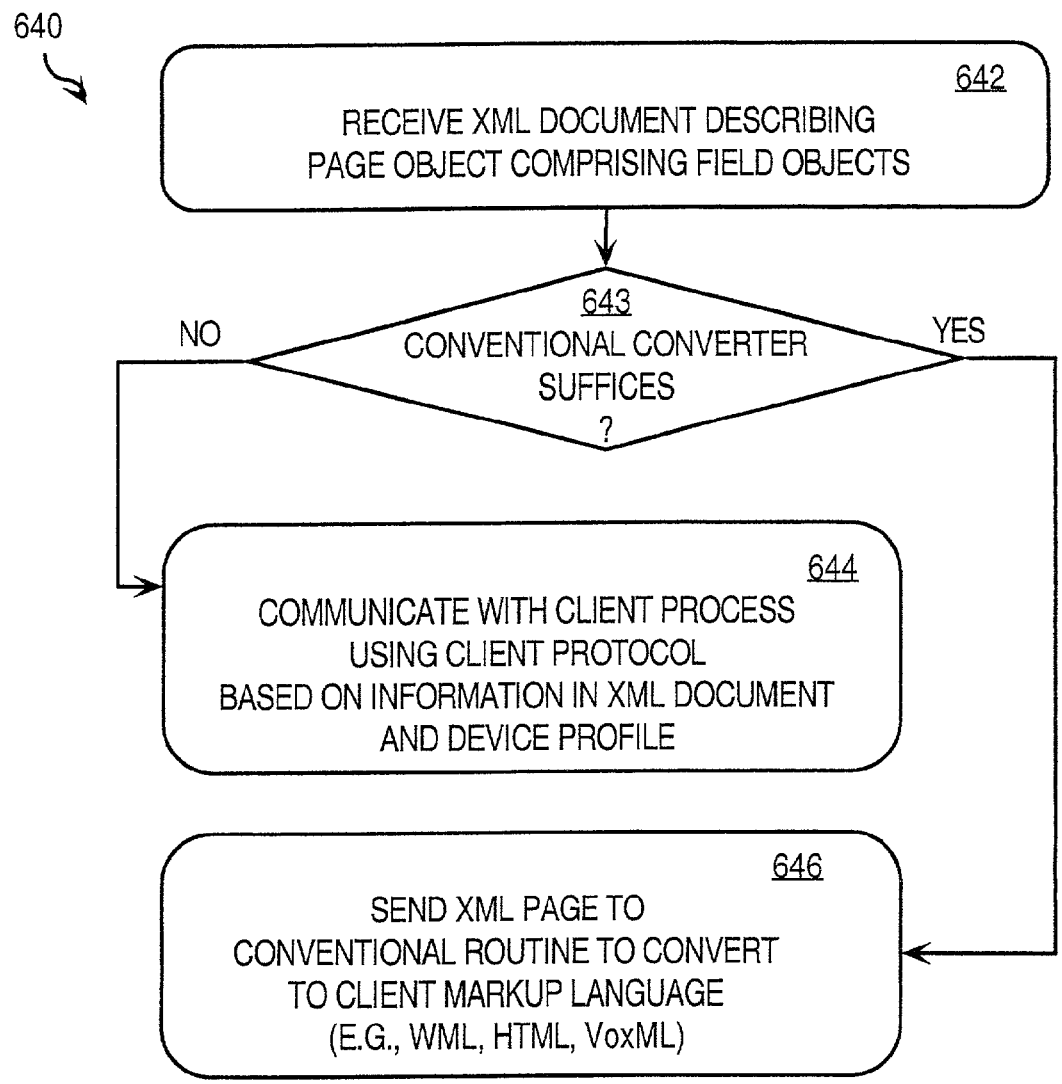
FIG. 6B is a flowchart that illustrates one embodiment of a method for an XML to protocol converter to manage page output for a particular mobile device.

FIG. 6B is a flowchart that illustrates the steps performed by one embodiment 640 of the converter routine 114. In step 642 the converter receives the XML document provided by the listener or the device-specific XML document provided by the presentation manager. In step 643 it is determined whether the client process is using a protocol that accepts documents that can be generated with a conventional XML converter 112, such as WML, HDML, VoxML and HTML. If so, control passes to step 646 to send the XML document to the conventional XML converter 112. If not, control passes to step 644 to communicate with the client process in the protocol of the client process (e.g., Telnet) based on the information in the XML document and the information about the mobile device in the device profile database 145.

Application Development Method

Figure 7:
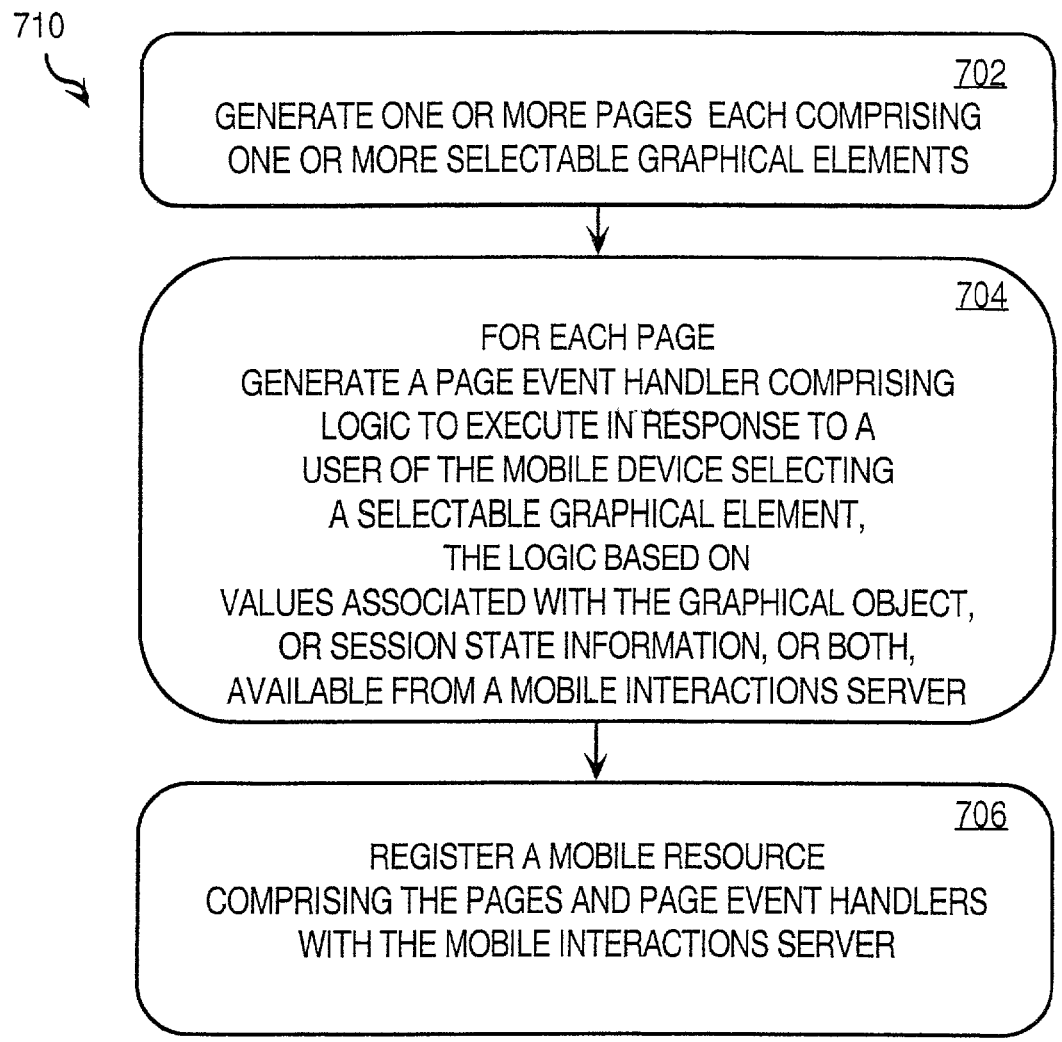
FIG. 7 is a flowchart that illustrates one embodiment of a method for an application developer to utilize a mobile interactions server.

FIG. 7 is a flowchart that illustrates one embodiment 710 of a method for an application developer to utilize a mobile interactions server.

In step 702, the developer generates an application made up of one or more pages each comprising one or more fields. In the preferred embodiment, each field is an instance of one of nine field type beans. In this embodiment, each page is an instance of a page bean.

In step 704, the developer generates a page event handler for each event associated with the page. The page event handler includes logic to execute based on a generic event generated by the mobile interactions server in response to a user of the mobile device acting on a graphical element corresponding to a field object on the page. The event includes an indication of a generic action performed by the user, and a reference to session state information. In the preferred embodiment, the page is a page bean object and the event handler is a page bean event handler method, and the fields are field type bean objects. A listener process passes an event object to the event handler method when calling the method, and the event object includes a reference to the field bean in the session object maintained by a state machine. Also the field beans include built-in field even handlers. Then, the application specific logic can be based on any information in the event object or the session object.

In step 706, the developer registers the application with the mobile interactions server. In the preferred embodiment, the developer generates a menu item bean including a method to execute when the application is first called, and a reference to the first page. Then a reference to the menu item bean, such as a URL identifying a file where a menu item bean is stored, is associated with a menu item added to a list of menu items presented to a client by the mobile interactions server as a main menu. In the preferred embodiment, the mobile interactions server provides a registration process. The developer runs the registration process and enters the reference to the menu item bean when prompted by the registration process. The developer also enters a label for the application that is used as the text for the label item on the main menu.

Hardware Overview

Figure 8:
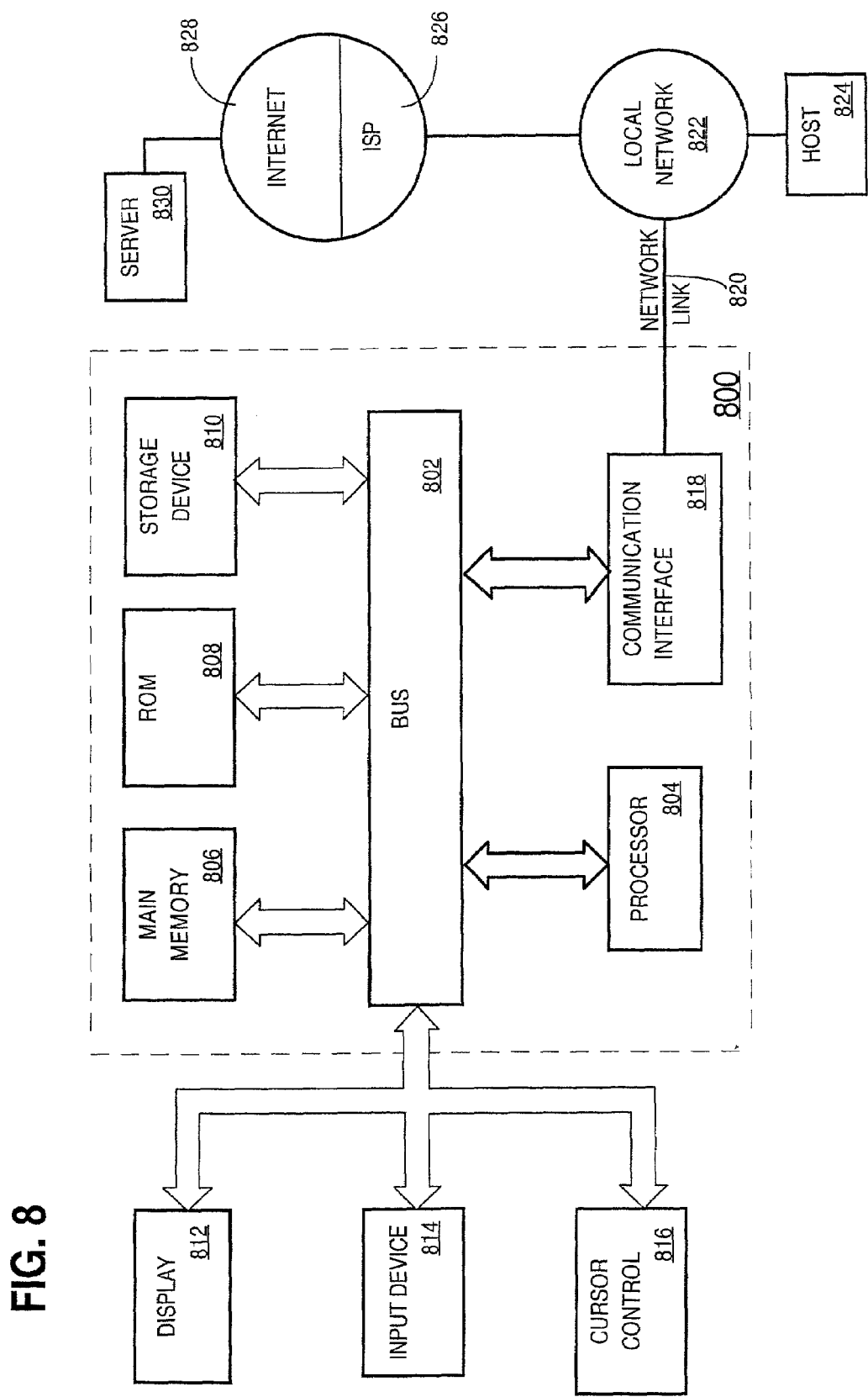
FIG. 8 is a block diagram that illustrates a computer system upon which an embodiment may be implemented.

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory ("RAM") or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory ("ROM") 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube ("CRT"), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for providing network applications for wireless mobile devices. According to one embodiment of the invention, a page for display on the mobile device is provided by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network ("ISDN") card or a modem to provide a data communication connection to a corresponding type of telephone line. As another example, communication interface 818 may be a local area network ("LAN") card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider ("ISP") 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. In accordance with the invention, one such downloaded application provides for a user interface as described herein.

The received code may be executed by processor 804 as it is received, and/or stored in storage device 810, or other non-volatile storage for later execution. In this manner, computer system 800 may obtain application code in the form of a carrier wave.

Scope

In the foregoing specification, the invention has been described with reference to specific embodiments thereof. It will, however, be evident that various modifications and changes may be made thereto without departing from the broader spirit and scope of the invention. In particular the order of some steps in the flow charts can be changed without affecting adversely the practice of the invention. The specification and drawings are, accordingly, to be regarded in an illustrative rather than a restrictive sense.

What is claimed is:

1. A method of interacting with a client process on a mobile device, connected to a network, to navigate an application, the method comprising the steps of:

managing information at a server executing on a platform connected to the network, the information containing first data describing a graphical element for display on the mobile device, wherein the graphical element includes at least one or more of an input text field, a button, a check list, a set of radio buttons, a pull down menu, a popup menu and the combinations thereof for prompting to obtain input from a user of the mobile device;

wherein the first data includes:
a first reference to the graphical element, and
values for a plurality of attributes of the graphical element, wherein one of the values associated with one of the plurality of attributes is a second reference to a page associated with requesting a service from a first application;

sending to the client process second data based on the first data to render the graphical element on the mobile device, wherein the second data includes the first reference to the graphical element;

in response to the user of the mobile device interacting with the graphical element, receiving at the server third data indicating the first reference to the graphical element; and in response to receiving the third data, performing the steps of:

reading the first reference from the third data;

using the first reference to the graphical element that is read from the third data to locate the first data that describes the graphical element;

after locating the first data that describes the graphical element, reading the second reference from the first data; and requesting the page from the first application based on the second reference.

2. The method of claim 1, wherein the second data does not include the second reference to the page.

3. The method of claim 1, wherein the step of managing further comprises storing the first data in a data structure.

4. The method of claim 3, wherein the second reference is a value of a next page attribute of the data structure.

5. The method of claim 3, wherein the data structure inherits methods and attributes from a bean class for exhibiting persistence and serialization.

6. The method of claim 5, wherein the bean class is a JavaBeans class.

7. The method of claim 1, further comprising the step of receiving fourth data from a second application, the fourth data describing the graphical element and including the second reference to the page associated with requesting the service from the first application.

8. The method of claim 7, wherein the second application is different than the first application.

9. The method of claim 7, wherein the second application is the same as the first application.

10. The method of claim 7, said step of managing information further comprising generating the first reference based on the fourth data.

11. The method of claim 1, further comprising the step of receiving fourth data from the first application in response to said step of requesting the page, the fourth data describing the page and comprising fifth data describing a different graphical element for display on the mobile device, the fifth data including a third reference to a different page associated with requesting a service from a second application.

12. The method of claim 11, wherein the information managed by the server includes the fifth data.

13. The method of claim 1, wherein the information managed includes fourth data about a plurality of pages associated with a plurality of applications and the step of managing the information further comprises generating a unique name for the page among the plurality of pages based on the second reference.

14. The method of claim 1, said step of requesting the page further comprising providing fourth data to the application based the information managed by the server.

15. The method of claim 14, wherein the fourth data includes the second reference.

16. The method of claim 14, wherein the third data does not include the fourth data.

17. The method of claim 14, wherein the second data does not include the fourth data.

18. The method of claim 14, wherein the fourth data comprises a universal resource locator (URL) address for the page for use with an Internet protocol (1P) on the network.

19. The method of claim 18, wherein the fourth data further comprises input parameters and corresponding values for use by the application at the URL address in providing the service associated with the page.

20. The method of claim 1, wherein:

the graphical element is included on a different page associated with requesting a different service from a second application;

the different page has a third reference; and the method further comprises requesting the different service from the second application in response to receiving the third data based on the third reference.

21. The method of claim 20, wherein the second application is different than the first application.

22. The method of claim 20, wherein the second application is the same as the first application.

23. The method of claim 20, wherein:

the information managed by the server includes fourth data describing the different page including the third reference to the different page;

the step of requesting the different service from the second application further comprising sending fifth data to the second application based on at least one of the first data and the fourth data.

24. The method of claim 20, wherein the step of requesting the different service from the second application comprises invoking a particular method of the second application.

25. The method of claim 24, wherein:

the particular method is an event handling method for an exiting page event associated with the different page;

the step of invoking the particular method further comprises generating an exiting page event for the different page; and the exiting page event includes the third reference.

26. The method of claim 25, wherein:

the page is data structure that inherits methods and attributes from a mobile bean class defining an event handling interface for an exiting page event; and the particular method is an implementation of the event handling interface; and the page includes the particular method.

27. The method of claim 26, wherein the mobile bean class inherits methods and attributes from a JavaBeans class.

28. The method of claim 20, wherein the second data does not include the third reference.

29. The method of claim 20, wherein the third data does not include the third reference.

30. The method of claim 20, said step of requesting the different service further comprising providing fourth data to the application.

31. The method of claim 30, wherein the fourth data comprises a universal resource locator (URL) address for the page for use with an Internet protocol (IP) on the network.

32. The method of claim 31, wherein the fourth data further comprises input parameters and corresponding values for use by the application at the URL address in providing the service associated with the page.

33. The method of claim 31, wherein the second data does not include the URL address.

34. The method of claim 31, wherein the third data does not include the URL address.

35. A method of interacting with a client process on a mobile device, connected to a network, to navigate an application, the method comprising the steps of:
   managing information at a server executing on a platform connected to the network, the information including:
      first data describing a plurality of pages sent for display on the mobile device, each page associated with requesting a service from an application, wherein each page has one or more graphical elements, wherein each graphical element includes at least one or more of an input text field, a button, a check list, a set of radio buttons, a pull down menu, a popup menu and the combinations thereof for prompting to obtain input from a user of the mobile device;
      wherein the first data includes:
         a first reference to each graphical element of the one or more graphical elements, and
         values for a plurality of attributes of each graphical element, wherein one of the values associated with one of the plurality of attributes is a second reference to one page of the plurality of pages; and
      second data describing associations between special keys on the mobile device and page changes among the plurality of pages;
   receiving third data from the client process indicating a user of the mobile device has pressed a particular key of the special keys; and
   in response to receiving the third data, performing the steps of:
      determining a particular page change of the page changes associated with the particular key,
      requesting the particular page change from the application,
      determining a particular page of the plurality of pages based on the first data and the particular page change, wherein the step of determining the particular page further comprises:
         using the particular page change of the page changes to locate the first data that describes the plurality of pages,
         after locating the first data, reading from the first data the particular second reference to the particular page, and
      sending, to the client process for rendering a particular graphical element of the particular page, fourth data based on the first data, the fourth data including a particular first reference to the particular graphical element.

36. The method of claim 35, wherein the page changes include a page back change and a page forward change.

37. The method of claim 35, wherein the page changes include a return to a menu page.

38. The method of claim 35, said step of requesting the particular page change from the application comprising the step of requesting the particular page from the application.

39. The method of claim 38, said step of requesting the particular page from the application comprising the steps of:
   generating fifth data indicating the particular page; and
   invoking a first method of the application with the fifth data as an input parameter.

40. The method of claim 39, wherein:
   the fifth data describes an event; and
   the first method of the application is an event handling method.

41. A computer-readable medium carrying instructions for interacting with a client process on a mobile device, connected to a network, to navigate an application, the computer-readable medium comprising instructions for causing one or more processors to perform the steps of:
   managing information at a server executing on a platform connected to the network, the information containing first data describing a graphical element for display on the mobile device, wherein the graphical element includes at least one or more of an input text field, a button, a check list, a set of radio buttons, a pull down menu, a popup menu and the combinations thereof for prompting to obtain input from a user of the mobile device;
   wherein the first data includes:
      a first reference to the graphical element, and
      values for a plurality of attributes of the graphical element, wherein one of the values associated with one of the plurality of attributes is a second reference to a page associated with requesting a service from a first application;
   sending to the client process second data based on the first data to render the graphical element on the mobile device, wherein the second data includes the first reference to the graphical element;
   in response to the user of the mobile device interacting with the graphical element, receiving at the server third data indicating the first reference to the graphical element; and
   in response to receiving the third data, performing the steps of:
      reading the first reference from the third data;
      using the first reference to the graphical element that is read from the third data to locate the first data that describes the graphical element;
      after locating the first data that describes the graphical element, reading the second reference from the first data; and
      requesting the page from the first application based on the second reference.

42. The computer-readable medium of claim 41, wherein the second data does not include the second reference to the page.

43. The computer-readable medium of claim 41, wherein the step of managing further comprises storing the first data in a data structure.

44. The computer-readable medium of claim 43, wherein the second reference is a value of a next page attribute of the data structure.

45. The computer-readable medium of claim 43, wherein the data structure inherits methods and attributes from a bean class for exhibiting persistence and serialization.

46. The computer-readable medium of claim 45, wherein the bean class is a JavaBeans class.

47. The computer-readable medium of claim 41, the instructions further causing the one or more processors to perform the step of receiving fourth data from a second application, the fourth data describing the graphical element and including the second reference to the page associated with requesting the service from the first application.

48. The computer-readable medium of claim 47, wherein the second application is different than the first application.

49. The computer-readable medium of claim 47, wherein the second application is the same as the first application.

50. The computer-readable medium of claim 47, said step of managing the information further comprising generating the first reference based on the fourth data.

51. The computer-readable medium of claim 41, the instructions further causing the one or more processors to perform the step of receiving fourth data from the first application in response to said step of requesting the page, the fourth data describing the page and comprising fifth data describing a different graphical element for display on the mobile device, the fifth data including a third reference to a different page associated with requesting a service from a second application.

52. The computer-readable medium of claim 51, wherein the information managed by the server includes the fifth data.

53. The computer-readable medium of claim 41, wherein the information managed includes fourth data about a plurality of pages associated with a plurality of applications and the step of managing the information further comprises generating a unique name for the page among the plurality of pages based on the second reference.

54. The computer-readable medium of claim 41, said step of requesting the page further comprising providing fourth data to the application based the information managed by the server.

55. The computer-readable medium of claim 54, wherein the fourth data includes the second reference.

56. The computer-readable medium of claim 54, wherein the third data does not include the fourth data.

57. The computer-readable medium of claim 54, wherein the second data does not include the fourth data.

58. The computer-readable medium of claim 54, wherein the fourth data comprises a universal resource locator (URL) address for the page for use with an Internet protocol (IP) on the network.

59. The computer-readable medium of claim 58, wherein the fourth data further comprises input parameters and corresponding values for use by the application at the URL address in providing the service associated with the page.

60. The computer-readable medium of claim 41, wherein:
the graphical element is included on a different page associated with requesting a different service from a second application;
the different page has a third reference; and
the instructions further causing the one or more processors to perform the step of requesting the different service from the second application in response to receiving the third data based on the third reference.

61. The computer-readable medium of claim 60, wherein the second application is different than the first application.

62. The computer-readable medium of claim 60, wherein the second application is the same as the first application.

63. The computer-readable medium of claim 60, wherein:
the information managed by the server includes fourth data describing the different page including the third reference to the different page;
the step of requesting the different service from the second application further comprising sending fifth data to the second application based on at least one of the first data and the fourth data.

64. The computer-readable medium of claim 60, wherein the step of requesting the different service from the second application comprises invoking a particular method of the second application.

65. The computer-readable medium of claim 64, wherein:
the particular method is an event handling method for an exiting page event associated with the different page;
the step of invoking the particular method further comprises generating an exiting page event for the different page; and
the exiting page event includes the third reference.

66. The computer-readable medium of claim 65, wherein:
the page is data structure that inherits methods and attributes from a mobile bean class defining an event handling interface for an exiting page event; and
the particular method is an implementation of the event handling interface; and
the page includes the particular method.

67. The computer-readable medium of claim 66, wherein the mobile bean class inherits methods and attributes from a JavaBeans class.

68. The computer-readable medium of claim 60, wherein the second data does not include the third reference.

69. The computer-readable medium of claim 60, wherein the third data does not include the third reference.

70. The computer-readable medium of claim 60, said step of requesting the different service further comprising providing fourth data to the application.

71. The computer-readable medium of claim 70, wherein the fourth data comprises a universal resource locator (URL) address for the page for use with an Internet protocol (IP) on the network.

72. The computer-readable medium of claim 71, wherein the fourth data further comprises input parameters and corresponding values for use by the application at the URL address in providing the service associated with the page.

73. The computer-readable medium of claim 71, wherein the second data does not include the URL address.

74. The computer-readable medium of claim 71, wherein the third data does not include the URL address.

75. A computer-readable medium carrying instructions for interacting with a client process on a mobile devices connected to a network, to navigate an application, the computer-readable medium comprising instructions for causing one or more processors to perform the steps of:
managing information at a server executing on a platform connected to the network, the information including:
first data describing a plurality of pages sent for display on the mobile device, each page associated with requesting a service from an application, wherein each page has one or more graphical elements, wherein each graphical element includes at least one or more of an input text field, a button, a check list, a set of radio buttons, a pull down menu, a popup menu and the combinations thereof for prompting to obtain input from a user of the mobile device; and
wherein the first data includes:
a first reference to each graphical element of the one or more graphical elements, and
values for a plurality of attributes of each graphical element, wherein one of the values associated with one of the plurality of attributes is a second reference to one page of the plurality of pages; and
second data describing associations between special keys on the mobile device and page changes among the plurality of pages;
receiving third data from the client process indicating a user of the mobile device has pressed a particular key of the special keys; and
in response to receiving the third data, performing the steps of:
determining a particular page change of the page changes associated with the particular key,
requesting the particular page change from the application, determining a particular page of the plurality of pages based on the first data and the particular page change, wherein the step of determining the particular page further comprises:
    using the particular page change of the page changes to locate the first data that describes the plurality of pages,
    after locating the first data, reading from the first data the particular second reference to the particular page, and
sending, to the client process for rendering a particular graphical element of the particular page, fourth data based on the first data, the fourth data including a particular first reference to the particular graphical element.

76. The computer-readable medium of claim 75, wherein the page changes include a page back change and a page forward change.

77. The computer-readable medium of claim 75, wherein the page changes include a return to a menu page.

78. The computer-readable medium of claim 75, said step of requesting the particular page change from the application comprising the step of requesting the particular page from the application.

79. The computer-readable medium of claim 78, said step of requesting the particular page from the application comprising the steps of:
    generating fifth data indicating the particular page; and
    invoking a first method of the application with the fifth data as an input parameter.

80. The computer-readable medium of claim 79, wherein:
the fifth data describes an event; and
the first method of the application is an event handling method.

81. A method for interacting with a client process on a mobile device, the method comprising performing a machine-executed operation involving instructions, wherein the machine-executed operation is at least one of:
    A) sending said instructions over transmission media;
    B) receiving said instructions over transmission media;
    C) storing said instructions onto a machine-readable storage medium; and
    D) executing the instructions;
wherein said instructions are instructions which, when executed by one or more processors, cause the one or more processors to perform the steps of:
    maintaining at a server a set of information about a graphical element,
    wherein:
        said set of information includes values for a plurality of attributes of said graphical element, and
        said set of information is associated with a unique name;
    wherein said graphical element is configured for receiving input from a user of said mobile device;
    storing at said server a mapping between a first reference and said unique name;
    sending to said client process data to render said graphical element at said mobile device, wherein said data includes said first reference but does not include said unique name;
    receiving at said server a request from said client process, wherein:
        said request indicates a particular action performed at said mobile device relative to said graphical element, and
        said request includes said first reference; and
    in response to receiving said request at said server, performing the steps of:
        reading said first reference from said request;
        determining said unique name based on said mapping and said first reference that is read from said request;
        using said unique name to locate said set of information; and
        responding to said particular action based on said set of information.

82. The method of claim 81, wherein:
said particular action performed at said mobile device relative to said graphical element indicates a particular request for a particular page from an application that is communicatively connected to said server;
said set of information includes a value for a particular attribute of said plurality of attributes of said graphical element, wherein said value references said particular page; and
said step of responding to said particular action includes retrieving said particular page based on said value of said particular attribute.

83. The method of claim 81, wherein said set of information is stored in a data structure that inherits methods and attributes from a bean class for exhibiting persistence and serialization.

84. The method of claim 83, wherein said bean class is a JavaBeans class.

* * * * *

UNITED STATES PATENT AND TRADEMARK OFFICE
CERTIFICATE OF CORRECTION

| | |
|---|---|
| PATENT NO. | : 7,051,080 B1 |
| APPLICATION NO. | : 09/872986 |
| DATED | : May 23, 2006 |
| INVENTOR(S) | : Jyotirmoy Paul et al. |

It is certified that error appears in the above-identified patent and that said Letters Patent is hereby corrected as shown below:

Column 58
Claim 75: Line 32, delete "mobile devices" and insert --mobile device,--.

Signed and Sealed this

Twenty-ninth Day of August, 2006

JON W. DUDAS
*Director of the United States Patent and Trademark Office*